US011928908B2

(12) United States Patent
Kimura et al.

(10) Patent No.: US 11,928,908 B2
(45) Date of Patent: Mar. 12, 2024

(54) MEDIUM PROCESSING DEVICE

(71) Applicant: Glory Ltd., Himeji (JP)

(72) Inventors: Tomohiro Kimura, Hyogo (JP); Yuji Shimodaira, Hyogo (JP)

(73) Assignee: GLORY LTD., Himeji (JP)

( * ) Notice: Subject to any disclaimer, the term of this patent is extended or adjusted under 35 U.S.C. 154(b) by 206 days.

(21) Appl. No.: 17/511,577

(22) Filed: Oct. 27, 2021

(65) Prior Publication Data

US 2022/0139144 A1 May 5, 2022

(30) Foreign Application Priority Data

Oct. 30, 2020 (JP) ................................ 2020-182561

(51) Int. Cl.
*G07D 11/40* (2019.01)
*G07D 11/13* (2019.01)
*G07D 11/14* (2019.01)

(52) U.S. Cl.
CPC ............. *G07D 11/13* (2019.01); *G07D 11/14* (2019.01); *G07D 11/40* (2019.01); *G07D 2211/00* (2013.01)

(58) Field of Classification Search
CPC ........ G07D 11/13; G07D 11/14; G07D 11/40; G07D 11/125; G07D 11/009; G07D 2211/00; G07F 19/205
See application file for complete search history.

(56) References Cited

U.S. PATENT DOCUMENTS

| | | | | |
|---|---|---|---|---|
| 10,339,744 | B2 * | 7/2019 | Lee | G07D 11/135 |
| 2002/0060400 | A1 | 5/2002 | Kobayashi et al. | |
| 2022/0108580 | A1 * | 4/2022 | Hamada | G07D 11/40 |
| 2022/0172547 | A1 * | 6/2022 | Tanaka | G07D 11/14 |
| 2022/0270428 | A1 * | 8/2022 | Tanaka | G07D 11/125 |

FOREIGN PATENT DOCUMENTS

| | | | |
|---|---|---|---|
| EP | 3032506 | A1 | 6/2016 |
| JP | 2012-174063 | A | 9/2012 |

OTHER PUBLICATIONS

Extended European search report dated Mar. 18, 2022, in corresponding European patent Application No. 21204433.3, 8 pages.

* cited by examiner

*Primary Examiner* — Luis A Gonzalez
(74) *Attorney, Agent, or Firm* — XSENSUS LLP

(57) ABSTRACT

A medium processing device includes: a transaction unit including a transaction port and configured to perform at least one of a process of taking in a medium or a process of taking out the medium through the transaction port; a cassette mounting unit including a mounting port wherein a medium cassette is mounted to the mounting port; a cassette processing unit configured to perform at least one of a process of carrying in the medium from the medium cassette mounted to the cassette mounting unit or a process of carrying out the medium to the medium cassette; and a closing member configured to selectively close the transaction port or the mounting port.

14 Claims, 15 Drawing Sheets

MEDIUM PROCESSING DEVICE

CROSS-REFERENCE TO RELATED APPLICATION

This application claims priority to Japanese Patent Application No. 2020-182561, filed on Oct. 30, 2020, the disclosure of which is incorporated herein by reference in its entirety.

Technical Field

The present disclosure relates to a medium processing device.

Background Art

In the related art, as a cash management system provided in a store, there is a known system including a first cash processing device that performs a settlement process by performing depositing and dispensing, and a second cash processing device that dispenses the cash to be loaded to the first cash processing device and deposits the cash collected from the first cash processing device. The first cash processing device is disposed at the register counter of a store, and the second cash processing device is disposed in the backyard of the store. As such a second cash processing device, a device disclosed in PTL 1 is known, for example.

In the device disclosed in PTL 1, when the clerk deposits a banknote by hand, a banknote acceptance unit is mounted at a depositing unit provided at the end portion of a transport unit. The banknote inserted to the acceptance unit by the clerk by hand is sent out from the banknote acceptance unit to the depositing unit, and is transported into the housing by the transport unit. On the other hand, when the clerk deposits a banknote using a banknote cassette, the banknote cassette is mounted to the depositing unit. The banknote in the banknote cassette is sent out to the depositing unit, and is transported by the transport unit into the housing.

CITATION LIST

Patent Literature

PTL 1

Japanese Patent Application Laid-Open No. 2012-174063

SUMMARY

A medium processing device of an embodiment of the present disclosure includes: a transaction unit including a transaction port and configured to perform at least one of a process of taking in a medium or a process of taking out the medium through the transaction port; a cassette mounting unit including a mounting port wherein a medium cassette is mounted to the mounting port; a cassette processing unit configured to perform at least one of a process of carrying in the medium from the medium cassette mounted to the cassette mounting unit or a process of carrying out the medium to the medium cassette; and a closing member configured to selectively close the transaction port or the mounting port.

DESCRIPTION OF EMBODIMENTS

In the device disclosed in PTL 1, one of the banknote acceptance unit and the banknote cassette is connected to the transport unit, and as such, it is necessary that when the banknote cassette is mounted in the state where the banknote acceptance unit is mounted, the banknote acceptance unit connected at the connecting portion be moved first, for example. In this manner, with the necessity of a replacement process of moving the banknote acceptance unit and mounting the banknote cassette to the free space, the operation is disadvantageously complicated.

To eliminate the complexity of such an operation, it is conceivable to adopt a configuration in which a mounting port where a banknote cassette is mounted and an inlet that allows insertion of banknotes by hand are disposed side by side, such that deposit of banknotes by hand or by using the banknote cassette is achieved without performing the above-described replacement process. However, such a configuration may cause a situation where the clerk who deposits a banknote by hand cannot decide whether the banknote should be inserted into the mounting port or the inlet, for example.

An object of the present disclosure is to provide a medium processing device that supports a manual medium transaction and a medium transaction using a medium cassette, and can be easily used by the user.

The medium processing device of the present disclosure supports a manual medium transaction and a medium transaction using a medium cassette, and can be easily used by the user.

Embodiments of the present disclosure will be described below with reference to the drawings.

Embodiment 1

Configuration of Sheet Processing Device

Figure 1:
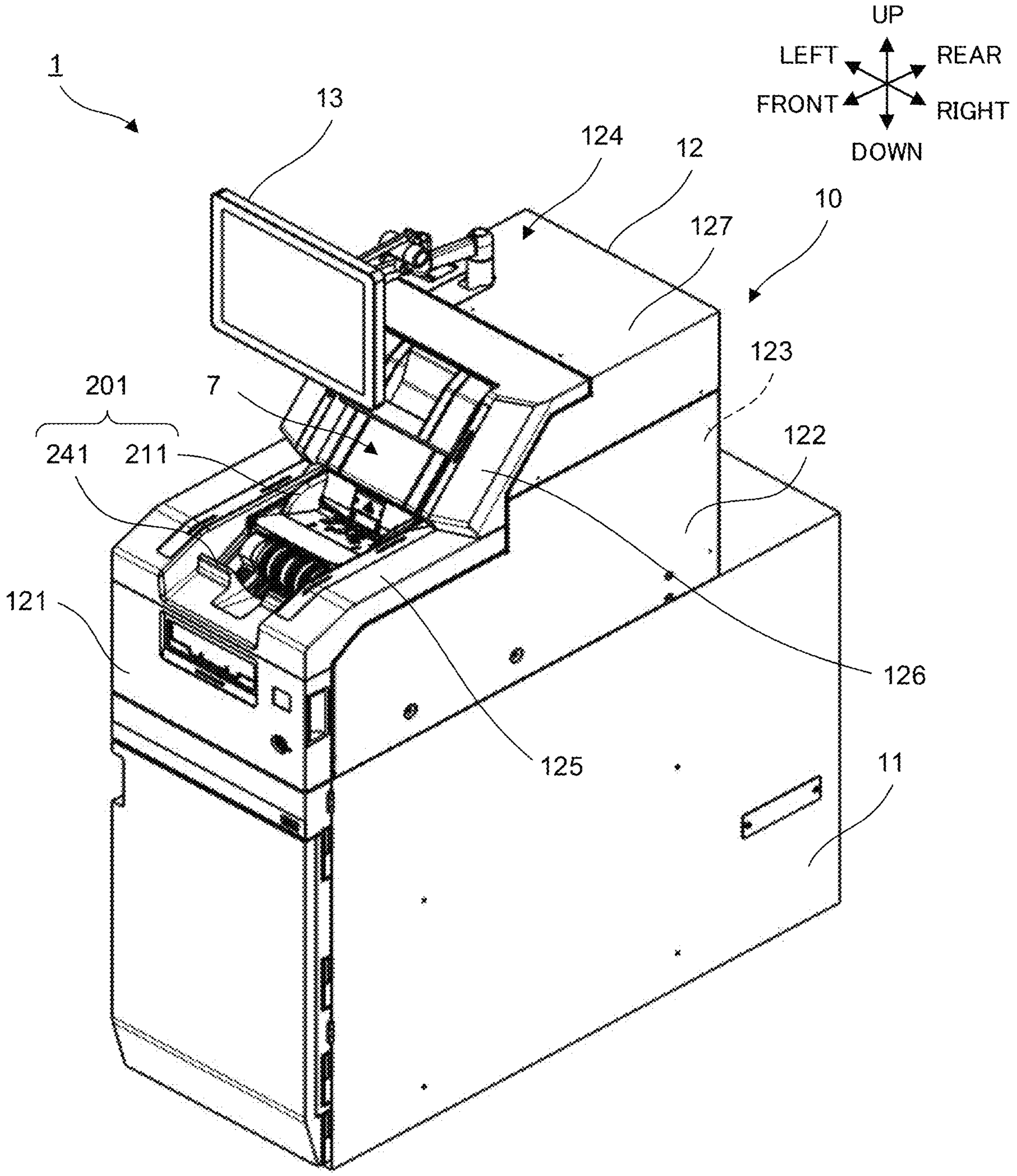
FIG. 1 is a perspective view of an external appearance of a sheet processing device according to Embodiment 1 of the present disclosure.
Figure 2:
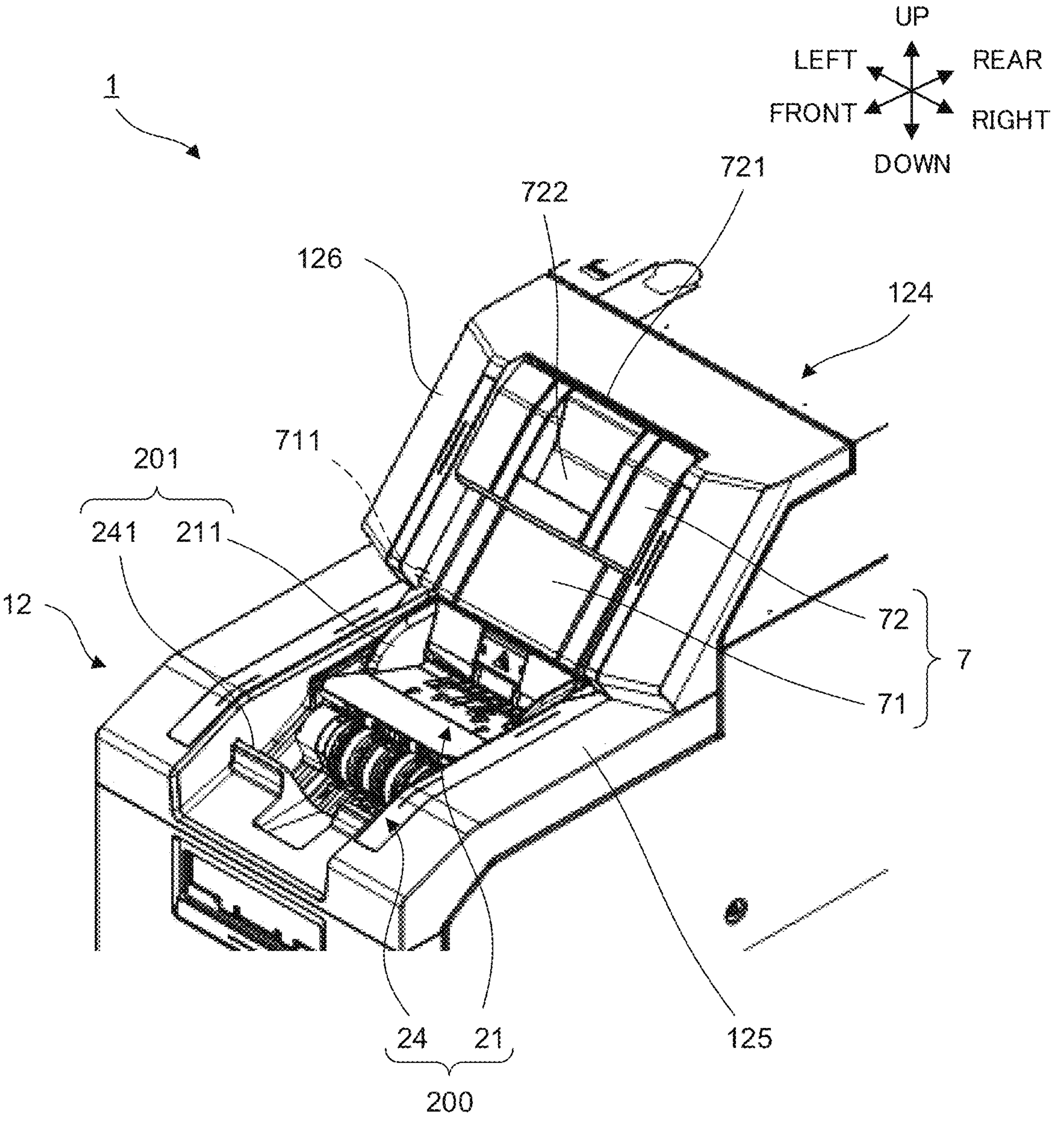
FIG. 2 is a perspective view of an upper housing according to Embodiment 1 of the present disclosure, and illustrates a state where a closing member closes a mounting port.
Figure 3:
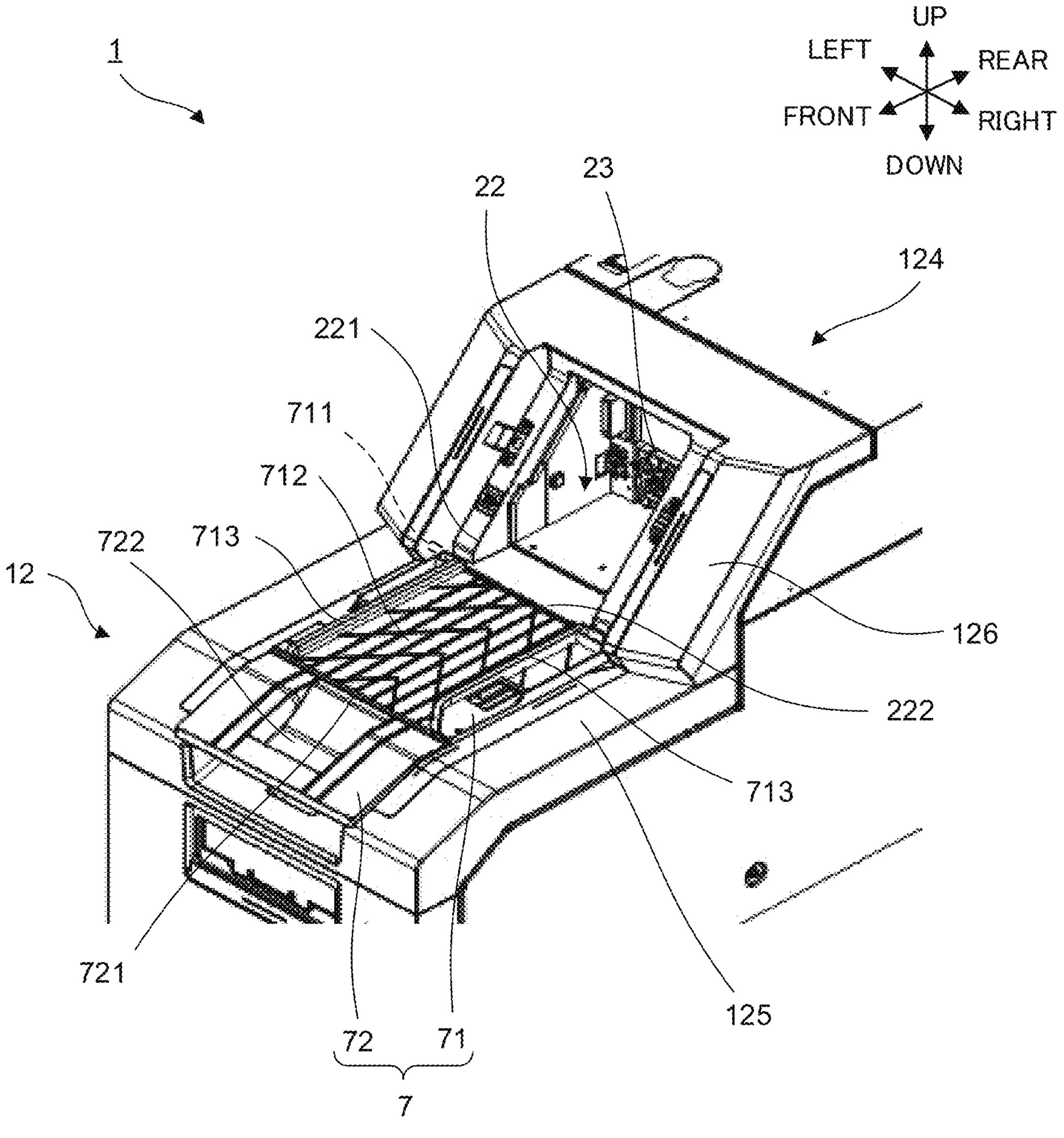
FIG. 3 is a perspective view of the upper housing according to Embodiment 1 of the present disclosure, and illustrates a state where the closing member closes a transaction port and a banknote transport cassette is not mounted.
Figure 4:
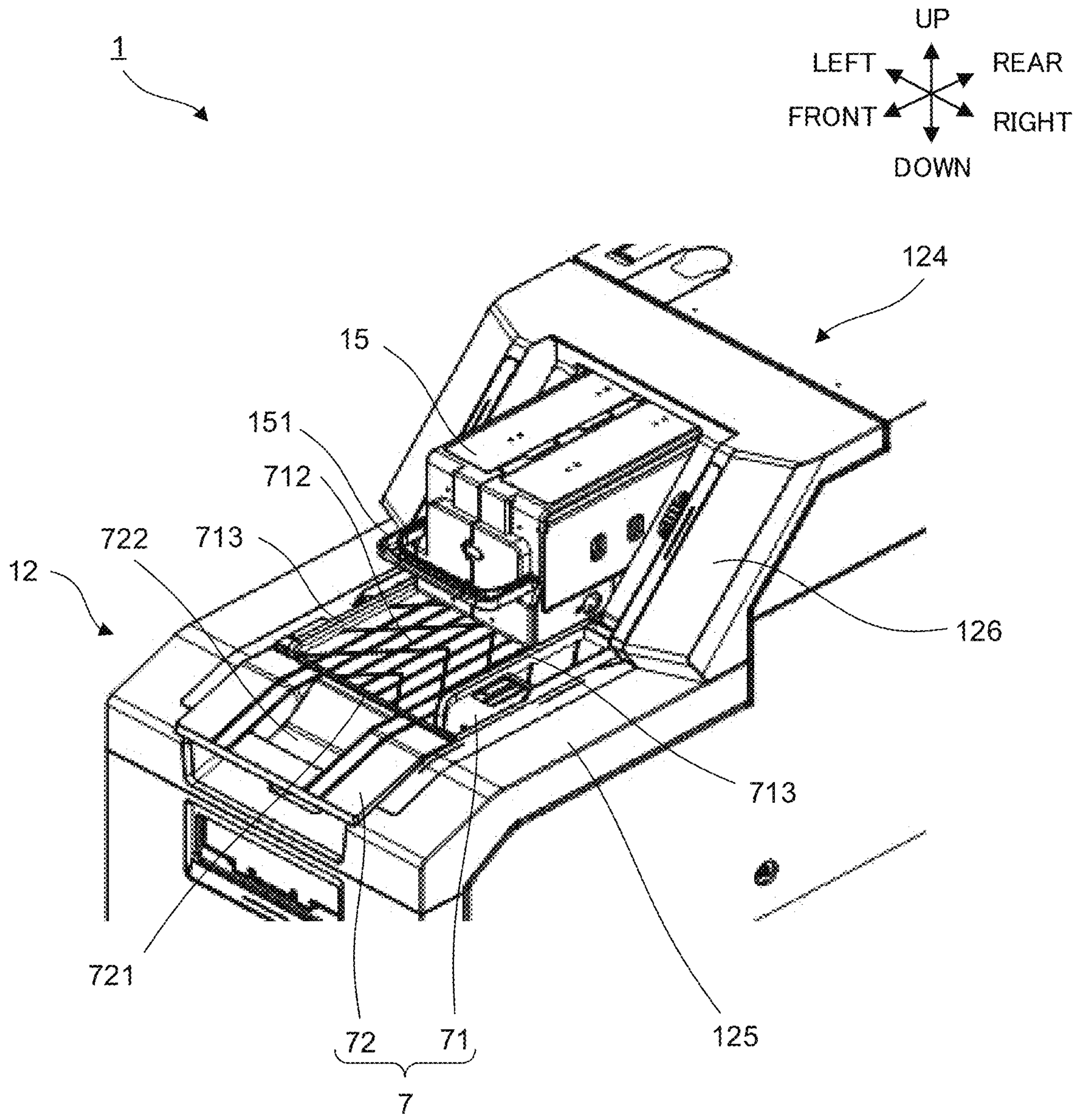
FIG. 4 is a perspective view of the upper housing according to Embodiment 1 of the present disclosure, and illustrates a state where the closing member closes the transaction port and the banknote transport cassette is mounted.
Figure 5:
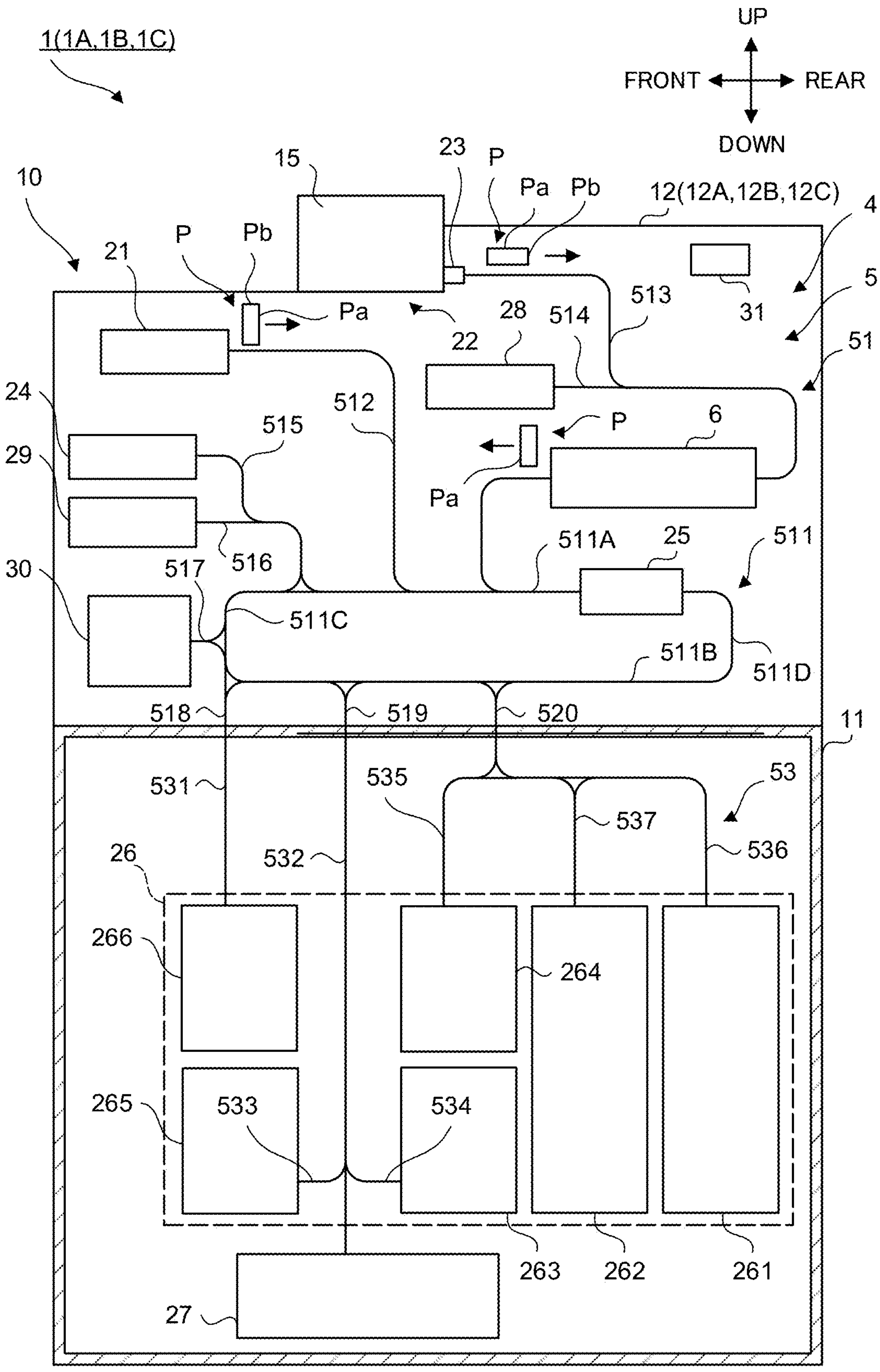
FIG. 5 is a schematic view illustrating an internal configuration of a sheet processing device according to Embodiments 1 to 4 of the present disclosure.

First, a configuration of a sheet processing device according to Embodiment 1 of the present disclosure is described. FIG. 1 is a perspective view of an external appearance of a sheet processing device according to Embodiment 1. FIG. 2 is a perspective view of an upper housing, and illustrates a state where a closing member closes a mounting port. FIG. 3 is a perspective view of the upper housing, and illustrates a state where the closing member closes a transaction port and a banknote transport cassette is not mounted. FIG. 4 is a perspective view of the upper housing, and illustrates a state where the closing member closes the transaction port and the banknote transport cassette is mounted. FIG. 5 is a schematic view illustrating an internal configuration of a sheet processing device. The arrangements and the like of the components of the sheet processing device may be described with the directions indicated in FIG. 1 to FIG. 5.

First, an exterior configuration of the sheet processing device is described. A sheet processing device 1 illustrated in FIG. 1 is an example of a medium processing device. The sheet processing device 1 processes a banknote as an example of a medium. The sheet processing device 1 is installed in the back office of a store such as a retail store, for example. Note that the sheet processing device 1 may be installed in the back office of financial institution such as a bank. The sheet processing device 1 includes a housing 10 including a lower housing 11 and an upper housing 12.

The lower housing 11 has a structure as a safe. The lower housing 11 has a configuration in which the door not illustrated in the drawing can be opened by only an authorized person such as an administrator.

The upper housing 12 is disposed on top of the lower housing 11. The upper housing 12 is provided with an operation unit 13 used for operating the sheet processing device 1. The operation unit 13 is composed of a touch panel. The upper housing 12 includes a front surface part 121, a left and right side surface part 122, a rear surface part 123, and a top surface part 124.

The top surface part 124 includes a front top surface part 125, a tilted surface part 126, and a rear top surface part 127. In plan view, the front top surface part 125 is provided from the front surface part 121 to the center position of the side surface part 122 in the front-rear direction. The tilted surface part 126 is provided on the rear side of the front top surface part 125. The tilted surface part 126 is tilted such that the rear end is higher than the front end. In plan view, the rear top surface part 127 is provided from the rear end of the tilted surface part 126 to the rear surface part 123.

As illustrated in FIG. 1 and FIG. 2, the front top surface part 125 is provided with an inlet 211 that makes up a depositing unit 21 and an outlet 241 that makes up a dispensing unit 24. The depositing unit 21 and the dispensing unit 24 make up a transaction unit 200. The inlet 211 and the outlet 241 make up a transaction port 201. The inlet 211 is provided on the rear side in the front top surface part 125. The outlet 241 is provided on the front side in the front top surface part 125. Note that functions and the like of the depositing unit 21 and the dispensing unit 24 are described later.

As illustrated in FIG. 3, the tilted surface part 126 is provided with a mounting port 221 that makes up a cassette mounting unit 22. The mounting port 221 is adjacently provided on the upper side of the transaction port 201. As illustrated in FIG. 4, a banknote transport cassette 15 inserted to the mounting port 221 is mounted to the cassette mounting unit 22. The banknote transport cassette 15 is an example of a medium cassette. Note that the functions and the like of the cassette mounting unit 22 and the banknote transport cassette 15 are described later.

As illustrated in FIG. 1 to FIG. 4, the top surface part 124 is provided with a closing member 7. The closing member 7 is configured to selectively close one of the transaction port 201 and the mounting port 221, and to not close the other of the transaction port 201 and the mounting port 221. The closing member 7 includes a first dividing member 71 and a second dividing member 72. Note that in the present disclosure, "close" means to include a state where a gap is present in the closing member itself and a state where a gap is present between the closing member and the transaction port or the mounting port, in addition to a state where the entirety of the transaction port or the entirety of the mounting port is closed.

The first dividing member 71 is formed in a square plate shape with a non-deformable material such as resin and metal. As illustrated in FIG. 1 and FIG. 2, the first dividing member 71 is formed in a size that can close the entirety of the mounting port 221. As illustrated in FIG. 3 and FIG. 4, the first dividing member 71 is formed in a square plate shape with a size that can close the entirety of the inlet 211 and a part of the outlet 241. In the following description, a state where the first dividing member 71 closes the entirety of the inlet 211 and a part of the outlet 241 may be referred to as "transaction port close state", and a state where the entirety of the mounting port 221 is closed may be referred to as "mounting port close state".

The first dividing member 71 is turnably coupled in the vicinity of the boundary between the front top surface part 125 and the tilted surface part 126. The first dividing member 71 turns around a pair of left and right first rotation axes 711 (in FIG. 2 and FIG. 3 illustrate only left first rotation axis 711). The first dividing member 71 is configured to be set to the transaction port close state when it turns forward (one direction) from the mounting port close state, and set to the mounting port close state when it turns rearward (the other direction) from the transaction port close state.

The first dividing member 71 is provided with a placing surface 712 on which to place the banknote transport cassette 15 when it is in the transaction port close state. The placing surface 712 is provided to be horizontal and at the same height as a bottom portion 222 of the mounting port 221 when it is in the transaction port close state. The placing surface 712 is provided with a pair of guides 713 that guides the banknote transport cassette 15 placed on the placing surface 712 to the mounting port 221. The pair of guides 713 is continuously provided from the front end to the rear end of the placing surface 712 so as to sandwich the banknote transport cassette 15 from the left and right sides.

As with the first dividing member 71, the second dividing member 72 is formed in a square plate shape with a non-deformable material such as resin and metal. As illustrated in FIG. 3 and FIG. 4, the second dividing member 72 is formed in a size that can close a portion that cannot be closed by the first dividing member 71 in the outlet 241.

The second dividing member 72 is turnably coupled with the turning end portion of the first dividing member 71. The second dividing member 72 turns around a second rotation axis 721. As illustrated in FIG. 1 and FIG. 2, the second dividing member 72 closes the entirely of the outlet 241 together with the first dividing member 71 when the first dividing member 71 is in the transaction port close state. As illustrated in FIG. 1 and FIG. 2, when the first dividing member 71 is in the mounting port close state, the second dividing member 72 turns with respect to the first dividing member 71 so as to make contact with the surface on the side opposite to the placing surface 712 of the first dividing member 71. That is, the closing member 7 is configured to be folded. The closing member 7 closes the mounting port 221 when it is in a folded state as illustrated in FIG. 1 and FIG. 2, and the closing member 7 closes the transaction port 201 when it is in a non-folded state as illustrated in FIG. 3 and FIG. 4. The second dividing member 72 is provided with an operation groove part 722 for the operator to insert a finger to turn the closing member 7.

As illustrated in FIG. 4, the banknote transport cassette 15 includes a handle 151. Further, the banknote transport cassette 15 includes at least a feed mechanism for ejecting a banknote P in an orientation in which a short side Pb of the banknote P (see FIG. 5) is on the front side in the transport direction, a storage mechanism for storing the banknote P transported in the orientation in which the short side Pb is on the front side in the transport direction, and a motor for driving these mechanisms. In the following description, the transport of the banknote P in the orientation in which the short side Pb is on the front side in the transport direction may be referred to as “short edge feed”. The banknote transport cassette 15 is configured such that it can transfer the banknote P to and from a specific device such as the sheet processing device 1 when it is mounted to the specific device. The banknote transport cassette 15 is configured such that the banknote P inside it cannot be taken out when it is separated from the specific device. Note that the banknote transport cassette 15 may each include a motor for operating the feed mechanism and the storage mechanism. In addition, it is also possible to adopt a structure in which a motor for driving the feed mechanism and the storage mechanism of the banknote transport cassette 15 is provided inside the sheet processing device 1 such that the motor supplies the power of the feed mechanism and the storage mechanism.

Next, an internal configuration of the sheet processing device 1 is described. As illustrated in FIG. 5, the sheet processing device 1 further includes the depositing unit 21, the cassette mounting unit 22, a cassette processing unit 23, the dispensing unit 24, a recognition unit 25, a storage unit 26, a collection unit 27, an upper reject storage unit 28, a count reject storage unit 29, a temporary storage unit 30, a sheet transport device 4, and a control unit 31. The depositing unit 21, the cassette mounting unit 22, the cassette processing unit 23, the dispensing unit 24, the recognition unit 25, the upper reject storage unit 28, the count reject storage unit 29, the temporary storage unit 30 and the control unit 31 are provided in the upper housing 12. The storage unit 26 and the collection unit 27 are provided in the lower housing 11. The control unit 31 may be called a processor or an internal computer. Note that the control unit 31 may be provided in the lower housing 11.

The sheet transport device 4 is configured such that it can transport the banknote P between the lower housing 11 and the upper housing 12. The sheet transport device 4 is composed of, for example, an endless belt guided on at least a pair of rollers or at least one roller, and a motor for driving them.

The depositing unit 21 is configured such that it can accumulate, in a stacked state, a plurality of banknotes P manually inserted by the operator through the inlet 211. The depositing unit 21 includes a feed mechanism for taking in (receiving) the plurality of accumulated banknotes P one by one in an orientation in which a long side Pa of the banknote P is on the front side in the take-in direction. The feed mechanism is composed of at least a pair of rollers and the like. In the following description, the transport of the banknote P in the orientation in which the long side Pa is on the front side in the transport direction may be referred to as “long edge feed”.

The cassette mounting unit 22 is configured such that the banknote transport cassette 15 inserted to the mounting port 221 can be mounted. When the banknote transport cassette 15 is mounted to the cassette mounting unit 22, the connector of the cassette mounting unit 22 and the connector of the banknote transport cassette 15 are connected, and the banknote transport cassette 15 can be controlled by the control unit 31.

The cassette processing unit 23 includes an opening (port) for carrying in the banknote P that is ejected from the banknote transport cassette 15 mounted to the cassette mounting unit 22 and is transported in a short edge feed manner, and transporting the banknote P to the sheet transport device 4 without changing the orientation. The cassette processing unit 23 carries out the banknote P that is transported from the sheet transport device 4 in a short edge feed manner, to the banknote transport cassette 15 without changing its orientation.

The dispensing unit 24 is configured such that the banknote P transported from the sheet transport device 4 can be accumulated such that the operator can take it out through the outlet 241.

As one process, the recognition unit 25 generates signals indicating the denomination, authentication, and fitness of the banknote P transported by the sheet transport device 4. These signals are transmitted to the control unit 31. The recognition unit 25 can generate a signal for detecting the orientation and size of the banknote P that is being transported and the distance between the banknotes P, and can transmit it to the control unit 31.

The storage unit 26 includes a first storage cassette 261, a second storage cassette 262, a third storage cassette 263, a fourth storage cassette 264, a fifth storage cassette 265, and a sixth storage cassette 266. Each of the first to sixth storage cassettes 261 to 266 may be a stack-type storage cassette that stores the banknotes P in a stacked manner, or a tape-type cassette that uses a belt tape attached to the outer peripheral surface of a drum to wind up the banknote P to the drum together with the tape. The first to sixth storage cassettes 261 to 266 take in and store the banknote P one by one, and send out the stored banknote one by one. The denominations to be stored in the first to sixth storage cassettes 261 to 266 are set in advance.

The collection unit 27 is configured such that it can collect the banknote P stored in the first to sixth storage cassettes 261 to 266 in the collection process, for example.

The upper reject storage unit 28 is configured to store the banknote P that is determined to be non-depositable by the control unit 31 based on a signal from the recognition unit 25 in a deposit process of storing the banknote P ejected from the banknote transport cassette 15 to the sheet transport device 4 in the storage unit 26, for example. The upper reject storage unit 28 is configured to store the banknote P that is determined to be non-withdrawable by the control unit 31 based on a signal from the recognition unit 25 in a dispensing process of dispensing the banknote P stored in the storage unit 26, for example. The upper reject storage unit 28 is configured such that the stored banknote P can be taken out.

The count reject storage unit 29 stores a banknote that is determined by the control unit 31 to be especially skewed based on a signal from the recognition unit 25 among the banknotes P determined to be non-depositable in a deposit process of the banknote P ejected from the banknote transport cassette 15 to the sheet transport device 4, for example. The count reject storage unit 29 is configured such that the stored banknote P can be taken out.

The temporary storage unit 30 temporarily stores the banknote P in a deposit process, for example. The temporary storage unit 30 is a tape-type storage unit that stores the banknote P by winding the banknote P together with the tape to the drum.

The control unit 31 controls the entirety of the sheet processing device 1. The process of the control unit 31 is elaborated later.

The sheet transport device 4 includes a transport unit 5 and an orientation change unit 6.

The transport unit 5 includes an upper transport unit 51 and a lower transport unit 53. The upper transport unit 51 is provided in the upper housing 12. The lower transport unit 53 is provided in the lower housing 11.

The upper transport unit 51 includes a first transport path 511, a second transport path 512, a third transport path 513, a fourth transport path 514, a fifth transport path 515, a sixth transport path 516, a seventh transport path 517, an eighth transport path 518, a ninth transport path 519, and a tenth transport path 520.

The first transport path 511 is configured in a loop form. The first transport path 511 includes an upper path 511A extending in the front-rear direction, a lower path 511B extending in the front-rear direction below the upper path 511A, a front inversion path 511C connecting between the upper path 511A and the lower path 511B on the front side, and a rear inversion path 511D connecting between the upper path 511A and the lower path 511B on the rear side. The upper path 511A is provided with the recognition unit 25.

The second transport path 512 connects the portion on the front side of the recognition unit 25 in the upper path 511A and the depositing unit 21. The third transport path 513 connects the upper path 511A and the cassette processing unit 23. The third transport path 513 is connected on the rear side of the connecting portion with the second transport path 512 in the upper path 511A. The third transport path 513 is provided with the orientation change unit 6. The fourth transport path 514 connects the upper reject storage unit 28 and the third transport path 513.

The fifth transport path 515 connects the upper path 511A and the dispensing unit 24. The fifth transport path 515 is connected on the front side of the connecting portion with the second transport path 512 in the upper path 511A. The sixth transport path 516 connects the fifth transport path 515 and the count reject storage unit 29. The seventh transport path 517 connects the front inversion path 511C and the temporary storage unit 30.

The eighth transport path 518 connects the front inversion path 511C and the lower transport unit 53. The ninth transport path 519 connects the lower path 511B and the lower transport unit 53. The tenth transport path 520 connects the lower path 511B and the lower transport unit 53. The tenth transport path 520 is connected on the rear side of the ninth transport path 519 in the lower path 511B.

The lower transport unit 53 includes an eleventh transport path 531, a twelfth transport path 532, a thirteenth transport path 533, a fourteenth transport path 534, a fifteenth transport path 535, a sixteenth transport path 536, and a seventeenth transport path 537.

The eleventh transport path 531 connects the eighth transport path 518 and the sixth storage cassette 266. The twelfth transport path 532 connects the ninth transport path 519 and the collection unit 27. The thirteenth transport path 533 connects the twelfth transport path 532 and the fifth storage cassette 265. The fourteenth transport path 534 connects the twelfth transport path 532 and the third storage cassette 263. The fifteenth transport path 535 connects the tenth transport path 520 and the fourth storage cassette 264. The sixteenth transport path 536 connects the fifteenth transport path 535 and the first storage cassette 261. The seventeenth transport path 537 connects the sixteenth transport path 536 and the second storage cassette 262.

The first to seventeenth transport paths 511 to 520 and 531 to 537 are composed of combinations of a roller, a belt wound around the roller, a motor that drives the roller, a side wall and the like. A passage sensor that detects the passage of the banknote P is provided at a predetermined position in the first to seventeenth transport paths 511 to 520 and 531 to 537. The control unit 31 transports the banknote P to a predetermined configuration by detecting the position of the banknote P based on a detection signal from the passage sensor, and controlling the transport unit 5.

The orientation change unit 6 changes the orientation of the banknote P that is being transported from the cassette processing unit 23 toward the recognition unit 25, from the orientation of the short edge feed to the orientation of the long edge feed. The orientation change unit 6 changes the orientation of the banknote P that is being transported from the recognition unit 25 toward the cassette processing unit 23 from the orientation of the long edge feed to the orientation of the short edge feed.

Operation of Sheet Processing Device

Next, an operation of the sheet processing device 1 is described. Note that the operation described below is merely an example, and other processes may be performed within an applicable range in the sheet processing device 1.

Deposit Process from Depositing Unit

First, as an operation of the sheet processing device 1, a deposit process from the depositing unit 21 is described. In the deposit process from the depositing unit 21, the control unit 31 of the sheet processing device 1 stores the banknote P taken from the depositing unit 21 in the orientation of the long edge feed, in the first to sixth storage cassettes 261 to 266 in the orientation of the long edge feed without rotating the banknote P.

First, the operator sets a state where the inlet 211 of the depositing unit 21 is not closed by the closing member 7. For example, in the case where the inlet 211 is closed with the closing member 7 and the mounting port 221 is not closed with the closing member 7 as illustrated in FIG. 3, the operator inserts a finger into the operation groove part 722 and pushes the second dividing member 72 rearward while pulling it up. Through this operation, the first dividing member 71 is turned rearward and the second dividing member 72 is turned with respect to the first dividing member 71, and thus, a state where the mounting port 221 is closed with the closing member 7 and the inlet 211 and the outlet 241 are not closed with the closing member 7 is set as illustrated in FIG. 2. Here, when the state is as illustrated in FIG. 2 at the time when the operator is about to perform the deposit process from the depositing unit 21, the operator does not perform the above-described operation.

The operator inserts at least one banknote P to the depositing unit 21 in the orientation of the long edge feed, and performs the start operation of the deposit process using the operation unit 13 of the sheet processing device 1. The control unit 31 controls the depositing unit 21 and the transport unit 5, and transports the banknote P one by one to the recognition unit 25. The recognition unit 25 recognizes the type, authentication and fitness of the sequentially transported banknote P, generates a signal indicating the recognition result, and outputs it to the control unit 31. The control unit 31 determines whether the banknote P is a depositable or non-depositable based on the received signal.

The control unit 31 controls the transport unit 5 and the first to sixth storage cassettes 261 to 266 based on the recognition result, and stores the depositable banknotes P in the first to sixth storage cassettes 261 to 266 by the denomination. At this time, the banknote P is stored in the first to sixth storage cassettes 261 to 266 in the orientation of the long edge feed.

The control unit 31 controls the transport unit 5 based on the recognition result, and transports the non-depositable banknote P to the dispensing unit 24 in the orientation of the long edge feed.

Dispensing Process from Dispensing Unit

Next, a dispensing process to the dispensing unit 24 is described. In the dispensing process from the dispensing unit 24, the sheet processing device 1 dispenses the banknote P sent out from the first to sixth storage cassettes 261 to 266 in the orientation of the long edge feed, from the dispensing unit 24 in the orientation of the long edge feed.

First, the operator sets a state where the outlet 241 of the dispensing unit 24 is not closed with the closing member 7. For example, as illustrated in FIG. 3, when the outlet 241 is closed with the closing member 7 and the mounting port 221 is not closed with the closing member 7, the operator operates the closing member 7 as in the above-described deposit process from the depositing unit 21, and sets a state where the inlet 211 and the outlet 241 are not closed with the closing member 7 as illustrated in FIG. 2. Here, when the state is as illustrated in FIG. 2 at the time when the operator is about to perform the dispensing process of the dispensing unit 24, the operator does not perform the above-described operation.

The operator performs a start operation of the dispensing process of a predetermined number of banknotes P of a predetermined denomination by using the operation unit 13. The control unit 31 transports the banknote P one by one to the recognition unit 25 by controlling the first to sixth storage cassettes 261 to 266 and the transport unit 5. At this time, the banknote P is transported to the recognition unit 25 in the orientation of the long edge feed. The recognition unit 25 recognizes the sequentially transported banknote P, generates a signal indicating the recognition result, and outputs it to the control unit 31. The control unit 31 determines whether the banknote P is withdrawable or non-withdrawable based on the received signal.

The control unit 31 controls the transport unit 5 based on the recognition result, and transports the withdrawable banknote P in the orientation of the long edge feed to the dispensing unit 24.

The control unit 31 retains the non-withdrawable banknote P in the orientation of the long edge feed at the temporary storage unit 30 by controlling the transport unit 5 and the temporary storage unit 30 based on the recognition result. After all banknotes P to be dispensed are transported to the dispensing unit 24, the control unit 31 transports the non-withdrawable banknote P to the upper reject storage unit 28 by controlling the temporary storage unit 30 and the transport unit 5. At this time, the orientation change unit 6 does not change the orientation of the banknote P. Therefore, the banknote P is transported to the upper reject storage unit 28 in the orientation of the long edge feed.

When the dispensing process is completed, the operator takes out the banknote P through the outlet 241.

Deposit Process from Banknote Transport Cassette

Next, a deposit process from the banknote transport cassette 15 is described. In the deposit process from the banknote transport cassette 15, the control unit 31 changes the orientation of the banknote P by rotating the banknote P transported from the banknote transport cassette 15 in the short edge feed manner, and stores it in the first to sixth storage cassettes 261 to 266 in the orientation of the long edge feed.

First, the operator sets a state where the mounting port 221 of the cassette mounting unit 22 is not closed with the closing member 7. For example, as illustrated in FIG. 2, when the mounting port 221 is closed with the closing member 7, the operator inserts a finger into the operation groove part 722, and lowers the second dividing member 72 while pulling it toward the operator. Through this operation, the first dividing member 71 is turned forward and the second dividing member 72 is turned with respect to the first dividing member 71, and thus, a state where the inlet 211 and the outlet 241 are closed with the closing member 7 and the mounting port 221 is not closed with the closing member 7 is set as illustrated in FIG. 3. Here, when the state is as illustrated in FIG. 3 at the time when the operator is about to perform the deposit process from the banknote transport cassette 15, the operator does not perform the above-described operation.

As illustrated in FIG. 4, the operator mounts the banknote transport cassette 15 to the cassette mounting unit 22. When mounting the banknote transport cassette 15 to the cassette mounting unit 22, the operator places the banknote transport cassette 15 on the placing surface 712 of the first dividing member 71 first. At this time, the operator places the banknote transport cassette 15 between the pair of guides 713. Next, by holding the handle 151 and pushing the banknote transport cassette 15 rearward, the operator slides the banknote transport cassette 15 along the guide 713 to mount it to the cassette mounting unit 22, for example.

The operator performs the start operation of the deposit process using the operation unit 13. The control unit 31 transports the banknote P one by one to the orientation change unit 6 by controlling the banknote transport cassette 15, the cassette processing unit 23 and the transport unit 5. At this time, the banknote P is sent out from the banknote transport cassette 15 in the orientation of the short edge feed, and transported to the orientation change unit 6 while keeping that orientation.

The control unit 31 changes the orientation of the banknote P from the orientation of the short edge feed to the orientation of the long edge feed by controlling the orientation change unit 6. The control unit 31 causes the recognition unit 25 to recognize the banknote P after the orientation change. When the control unit 31 determines that the banknote P is depositable, the control unit 31 stores the banknote P in the first to sixth storage cassettes 261 to 266 by the denomination by controlling the transport unit 5 and the first to sixth storage cassettes 261 to 266. At this time, the banknote P is stored in the first to sixth storage cassettes 261 to 266 in the orientation of the long edge feed. That is, the banknote P deposited from the banknote transport cassette 15 is stored in the first to sixth storage cassettes 261 to 266 in the same orientation as the banknote P deposited from the depositing unit 21. When the control unit 31 determines that the banknote P is non-depositable, the control unit 31 stores it in the count reject storage unit 29 by controlling the transport unit 5.

When the deposit process from the banknote transport cassette 15 is completed, the operator detaches the banknote transport cassette 15 from the cassette mounting unit 22. At this time, by holding the handle 151 and pulling the banknote transport cassette 15 toward the operator, the operator slides the banknote transport cassette 15 along the guide 713 to detach it from the cassette mounting unit 22.

Dispensing Process to Banknote Transport Cassette

Next, a dispensing process to the banknote transport cassette 15 is described. In the dispensing process to the banknote transport cassette 15, the sheet processing device 1 stores the banknote P sent out from the first to sixth storage cassettes 261 to 266 in the orientation of the long edge feed, in the banknote transport cassette 15 in the orientation of the short edge feed.

First, a state where the mounting port 221 of the cassette mounting unit 22 is not closed with the closing member 7 is set. For example, when the mounting port 221 is closed with the closing member 7 as illustrated in FIG. 2, the operator operates the closing member 7 as in the above-described deposit process from the banknote transport cassette 15, and sets a state where the mounting port 221 is not closed with the closing member 7 as illustrated in FIG. 3. Here, when the state is as illustrated in FIG. 3 at the time when the operator is about to perform the dispensing process from the banknote transport cassette 15, the operator does not perform the above-described operation.

The operator performs the start operation of the dispensing process of a predetermined number of banknotes P of a predetermined denomination using the operation unit 13 after the banknote transport cassette 15 is mounted to the cassette mounting unit 22 through the same operation as the above-described deposit process from the banknote transport cassette 15. The control unit 31 transports the banknote P one by one to the recognition unit 25 by controlling the first to sixth storage cassettes 261 to 266 and the transport unit 5. At this time, the banknote P is transported to the recognition unit 25 in the orientation of the long edge feed. The recognition unit 25 recognizes the sequentially transported banknote P, generates a signal indicating the recognition result, and outputs it to the control unit 31. The control unit 31 determines whether the banknote P is withdrawable or non-withdrawable based on the received signal.

When the control unit 31 determines that the banknote P is non-withdrawable, the control unit 31 stores the banknote P in the upper reject storage unit 28 by controlling the transport unit 5 and the orientation change unit 6 without performing the process on the banknote P at the orientation change unit 6.

When the control unit 31 determines that the banknote P is withdrawable, the control unit 31 changes the orientation of the banknote P from the orientation of the long edge feed to the orientation of the short edge feed by controlling the orientation change unit 6. The control unit 31 stores the banknote P after the orientation change in the banknote transport cassette 15 one by one by controlling the transport unit 5, the cassette processing unit 23 and the banknote transport cassette 15.

When the dispensing process to the banknote transport cassette 15 is completed, the operator detaches the cassette mounting unit 22 from the banknote transport cassette 15 through the same operation as the above-described deposit process from the banknote transport cassette 15.

Operation and Effect of Embodiment 1

The sheet processing device 1 includes the closing member 7 configured to selectively close one of the transaction port 201 and the mounting port 221, and not close the other of the transaction port 201 and the mounting port 221. Thus, the operator can readily specify the place for inserting the banknote P or the place for taking out the banknote P by visually recognizing the state where the closing member 7 closes the mounting port 221 without closing the transaction port 201 when performing the deposit process from the depositing unit 21 or the dispensing process to the dispensing unit 24 as illustrated in FIG. 2. In addition, the operator can readily specify the place for inserting the banknote transport cassette 15 by visually recognizing the state where the closing member 7 closes the transaction port 201 without closing the mounting port 221 when performing the deposit process from the banknote transport cassette 15 or the dispensing process to the banknote transport cassette 15 as illustrated in FIG. 3. Thus, it is possible to provide the sheet processing device 1 that supports manual transaction of the banknote P and the transaction of the banknote P using the banknote transport cassette 15, and can be easily used by the operator.

The mounting port 221 of the cassette mounting unit 22 is adjacently provided on the upper side of the transaction port 201. The closing member 7 includes the placing surface 712 on which to place the banknote transport cassette 15 in the case where the transaction port 201 is closed. Thus, the operator can mount the banknote transport cassette 15 to the cassette mounting unit 22 after placing it on the placing surface 712 once. Thus, the load of the operator for mounting the banknote transport cassette 15 can be reduced. In addition, since the transaction port 201 is closed, it is possible to reduce the situation where the banknote transport cassette 15 hits the transaction port 201 and damages the transaction port 201, the depositing unit 21 and the dispensing unit 24 when mounting the banknote transport cassette 15.

The closing member 7 is configured such that the height of the placing surface 712 when the transaction port 201 is closed by the closing member 7 is at the same height as the bottom portion 222 of the mounting port 221. Thus, the operator can mount the banknote transport cassette 15 to the cassette mounting unit 22 through an easy operation of only sliding the banknote transport cassette 15 on the placing surface 712.

The placing surface 712 is provided with the guide 713 for guiding the banknote transport cassette 15 to the mounting port 221. Thus, the operator can mount the banknote transport cassette 15 on the cassette mounting unit 22 through an easier operation of only sliding the banknote transport cassette 15 along the guide 713.

Embodiment 2

Configuration of Sheet Processing Device

Figure 6:
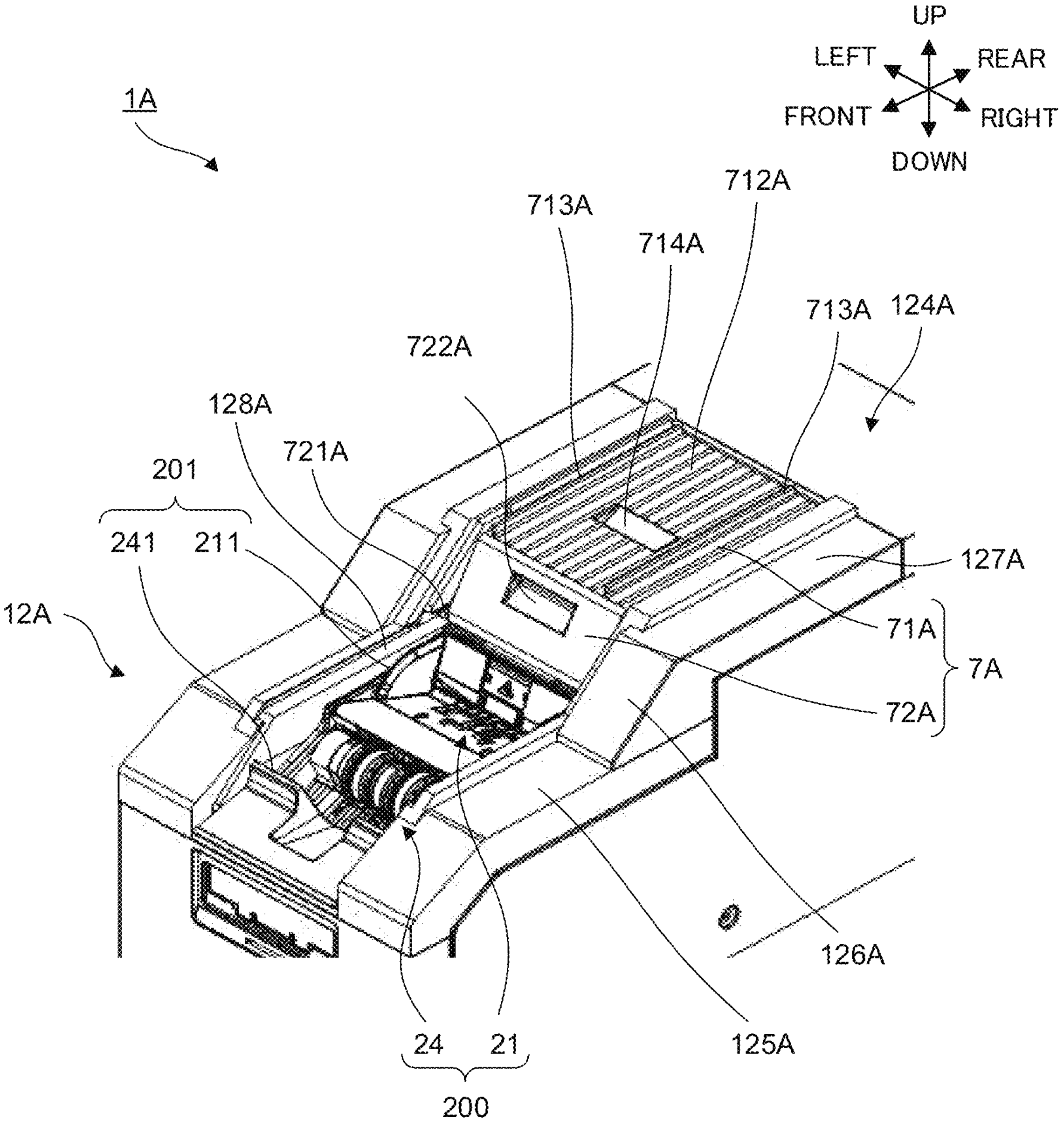
FIG. 6 is a perspective view of an upper housing according to Embodiment 2 of the present disclosure, and illustrates a state where a closing member closes a mounting port.
Figure 7:
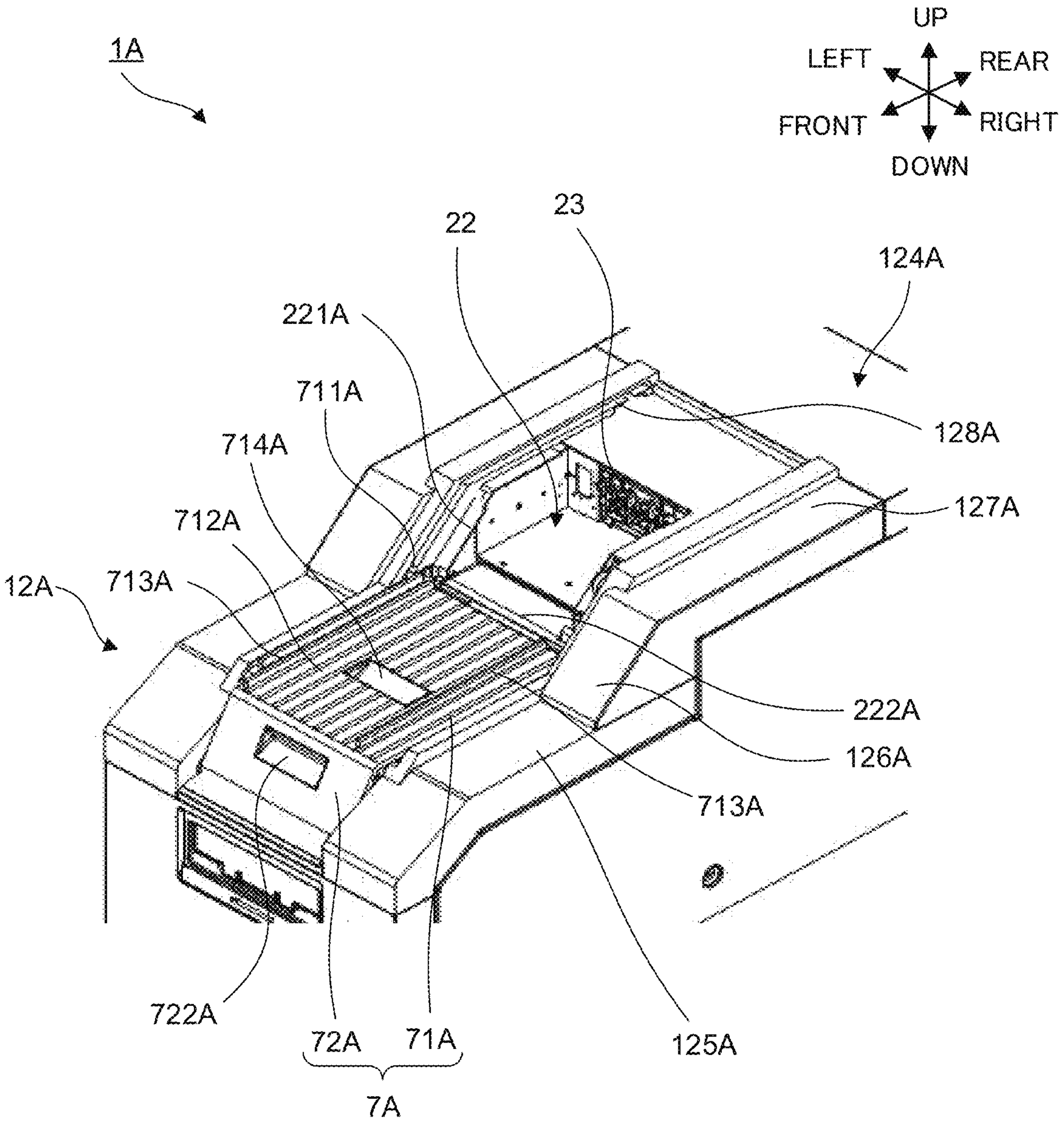
FIG. 7 is a perspective view of the upper housing according to Embodiment 2 of the present disclosure, and illustrates a state where the closing member closes a transaction port and a banknote transport cassette is not mounted.
Figure 8:
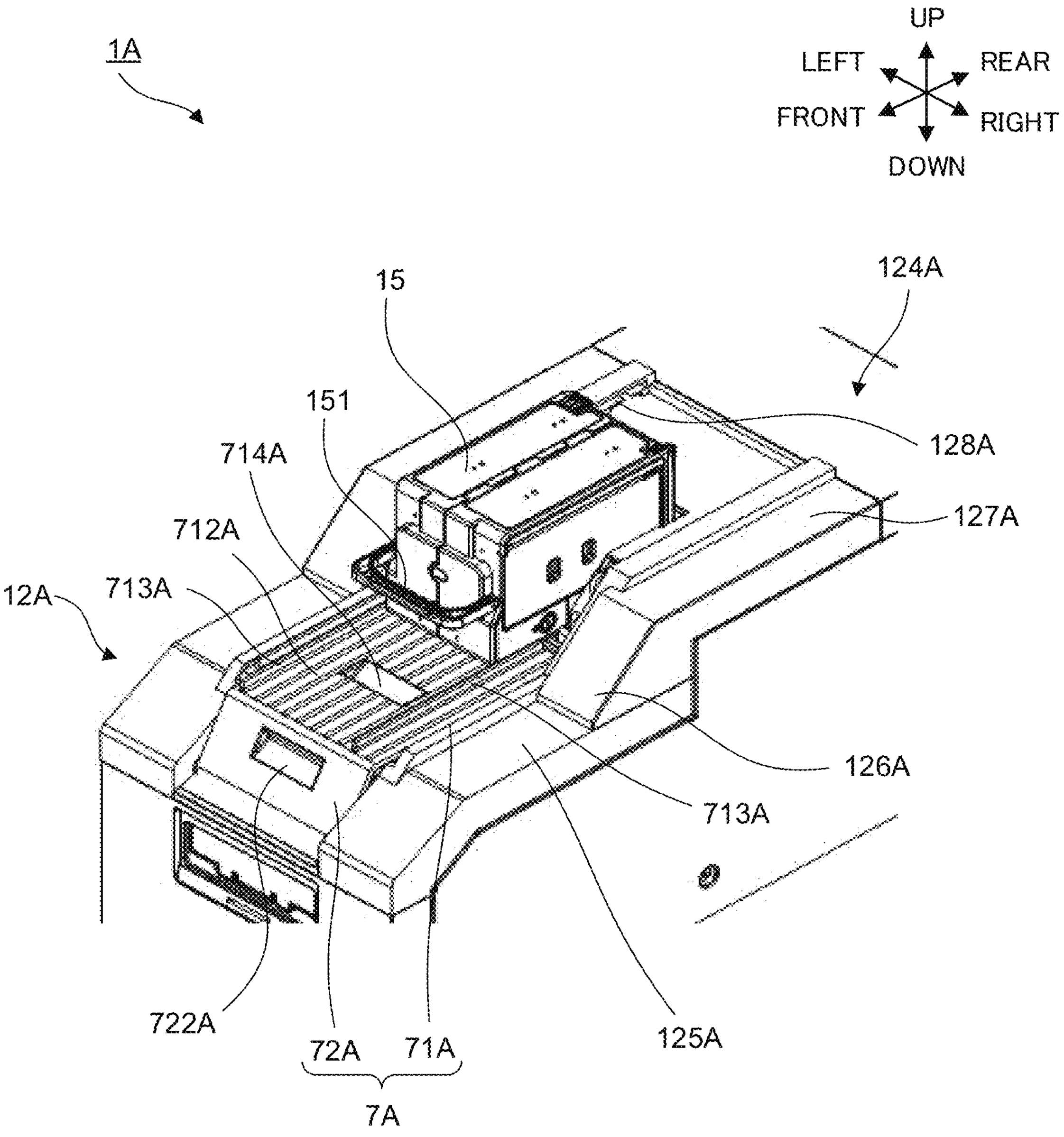
FIG. 8 is a perspective view of the upper housing according to Embodiment 2 of the present disclosure, and illustrates a state where the closing member closes the transaction port and the banknote transport cassette is mounted.

Next, a configuration of a sheet processing device according to Embodiment 2 of the present disclosure is described. Note that the sheet processing device of Embodiment 1 and the sheet processing device of Embodiment 2 differ from each other in the configurations of the upper housing and the closing member, and therefore the difference is described. FIG. 6 is a perspective view of the upper housing, and illustrates a state where a closing member closes a mounting port. FIG. 7 is a perspective view of the upper housing, and illustrates a state where the closing member closes a transaction port and a banknote transport cassette is not mounted. FIG. 8 is a perspective view of the upper housing, and illustrates a state where the closing member closes the transaction port and the banknote transport cassette is mounted.

As illustrated in FIG. 6, an upper housing 12A of a sheet processing device 1A is different from the upper housing 12 of Embodiment 1 in the shape of a top surface part 124A. A front top surface part 125A of the top surface part 124A is provided with the inlet 211 and the outlet 241. A tilted surface part 126A and a rear top surface part 127A of the top surface part 124A are provided with a mounting port 221A that makes up the cassette mounting unit 22 as illustrated in FIG. 7. The mounting port 221A is adjacently provided on the upper side of the transaction port 201.

The top surface part 124A is provided with a closing member 7A as illustrated in FIG. 6 to FIG. 8. The closing member 7A is configured to selectively close one of the transaction port 201 and the mounting port 221A, and to not close the other of the transaction port 201 and the mounting port 221A. The closing member 7A is formed of a non-deformable material such as resin and metal. The closing member 7A includes a first closing part 71A and a second closing part 72A.

The first closing part 71A is formed in a square plate shape. The first closing part 71A is configured to close a part of the transaction port 201 or a part of mounting port 221A in a state where it is parallel to the horizontal plane. The second closing part 72A is formed in a square plate shape. The second closing part 72A is provided at the front end of the first closing part 71A. The second closing part 72A is tilted such that the rear end is located at a position higher than that of the front end. The second closing part 72A is configured to close the other parts of the transaction port 201 or the other parts of the mounting port 221A in a state where it is tilted with respect to the horizontal plane.

A pair of first supported parts 711A protruding to the left and right sides (FIG. 7 illustrates only the left first supported part 711A) is provided at the rear end of the first closing part 71A. A pair of second supported parts 721A protruding to the left and right sides (FIG. 6 illustrates only the left second supported part 721A) is provided at the front end of the second closing part 72A. The first supported part 711A and the second supported part 721A are formed in cylindrical shapes with the same length. The first and second supported parts 711A and 721A are supported from below by a pair of rails 128A (FIG. 6 to FIG. 8 only illustrate the left rail 128A) continuously provided from the rear top surface part 127A to the front top surface part 125A. The closing member 7A selectively closes one of the transaction port 201 and the mounting port 221A by sliding in the front-rear direction without changing the orientation while keeping the state where the first and second supported parts 711A and 721A are supported by the pair of rails 128A.

The top surface of the first closing part 71A makes up the placing surface 712 A on which to place the banknote transport cassette 15. As illustrated in FIG. 7, the placing surface 712A is configured such that when the transaction port 201 is closed by the closing member 7A, it is horizontal and at the same height as a bottom portion 222A of the mounting port 221A. As illustrated in FIG. 8, the placing surface 712A is provided with the pair of guides 713A that guide the banknote transport cassette 15 to the mounting port 221A. The pair of guides 713A is continuously provided from the front end to the rear end of the placing surface 712A so as to sandwich the banknote transport cassette 15 from the left and right sides. The placing surface 712A is provided with a first operation groove part 714A for the operator to insert a finger to slide the closing member 7A. A second operation groove part 722A is provided at the front surface of the second closing part 72A.

Operation and Effect of Embodiment 2

The sheet processing device 1A provides the following effects in addition to the same effects as those of the sheet processing device 1 of Embodiment 1. The closing member 7A selectively closes one of the transaction port 201 and the mounting port 221A by sliding along the rail 128A. Thus, the operator can selectively close one of the transaction port 201 and the mounting port 221A through an easier operation of only sliding the closing member 7A along the rail 128A.

Embodiment 3

Configuration of Sheet Processing Device

Figure 9:
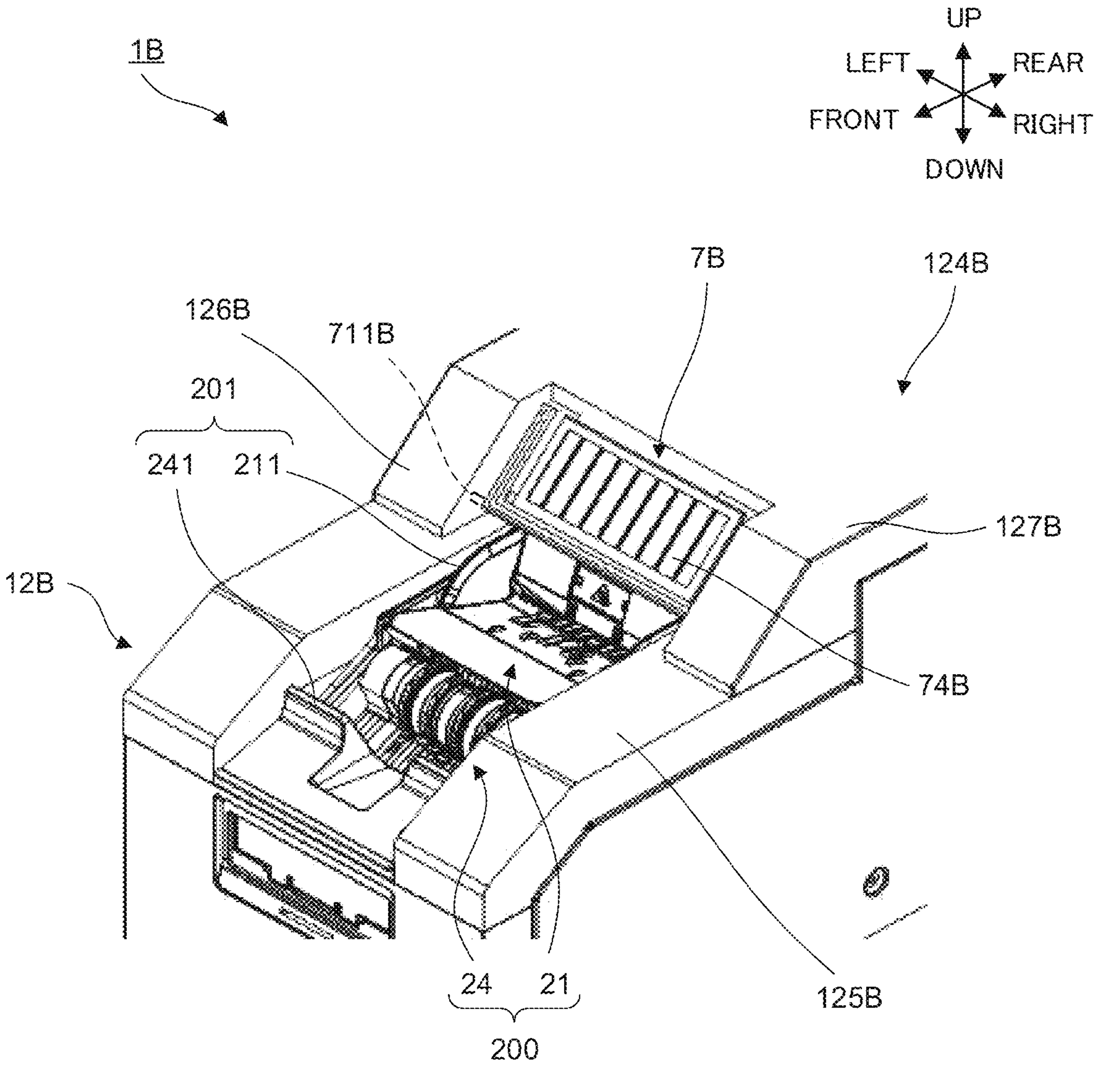
FIG. 9 is a perspective view of an upper housing according to Embodiment 3 of the present disclosure, and illustrates a state where a closing member closes a mounting port.
Figure 10:
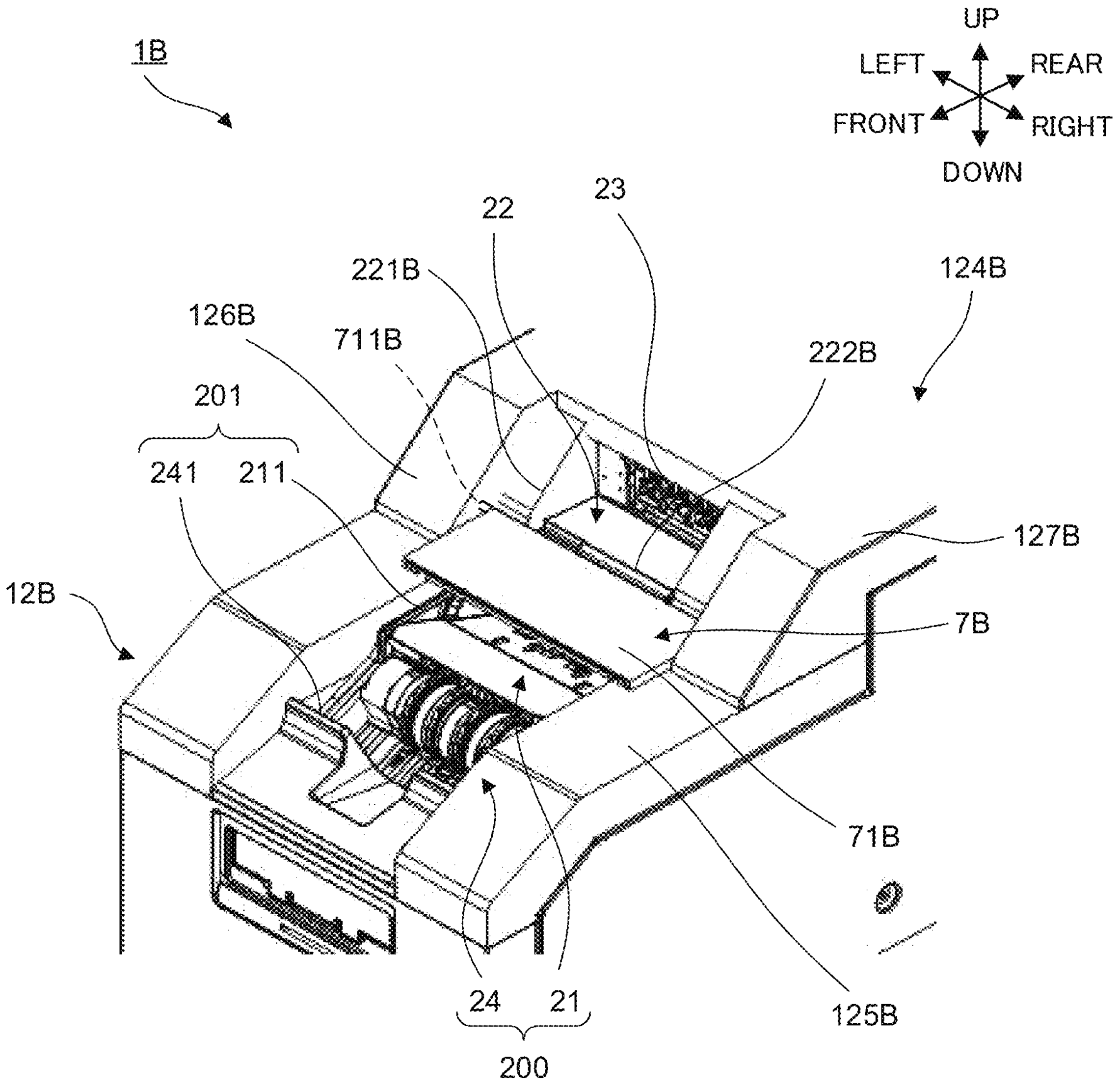
FIG. 10 is a perspective view of the upper housing according to Embodiment 3 of the present disclosure, and illustrates a state where the closing member is turned to close the transaction port.
Figure 11:
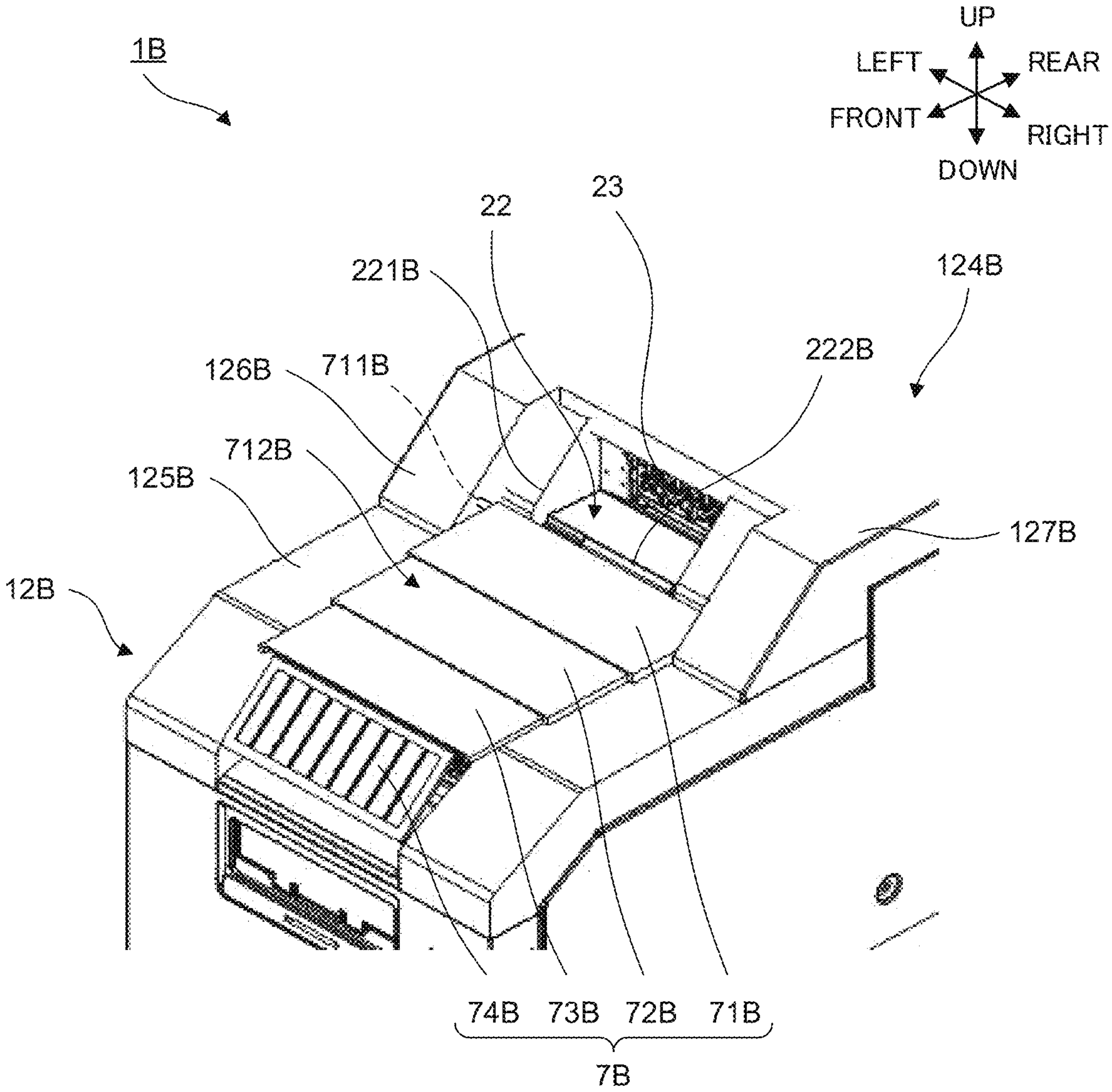
FIG. 11 is a perspective view of the upper housing according to Embodiment 3 of the present disclosure, and illustrates a state where the closing member closes the transaction port.

Next, a configuration of a sheet processing device according to Embodiment 3 of the present disclosure is described. Note that the sheet processing device of Embodiment 1 and the sheet processing device of Embodiment 3 are different from each other in the configurations of the upper housing and the closing member, and therefore the difference is described. FIG. 9 is a perspective view of the upper housing, and illustrates a state where a closing member closes a mounting port. FIG. 10 is a perspective view of the upper housing, and illustrates a state where the closing member is turned to close the transaction port. FIG. 11 is a perspective view of the upper housing, and illustrates a state where the closing member closes the transaction port.

As illustrated in FIG. 9, an upper housing 12B of the sheet processing device 1B is different from the upper housing 12 of Embodiment 1 in the shape of a top surface part 124B. The inlet 211 and the outlet 241 are provided at a front top surface part 125B of the top surface part 124B. A mounting port 221B that makes up the cassette mounting unit 22 is provided at a tilted surface part 126B and a rear top surface part 127B of the top surface part 124B as illustrated in FIG. 10. The mounting port 221B is adjacently provided on the upper side of the transaction port 201.

As illustrated in FIG. 9 to FIG. 11, the top surface part 124B is provided with a closing member 7B. The closing member 7B is configured to selectively close one of the transaction port 201 and the mounting port 221B, and to not close the other of the transaction port 201 and the mounting port 221B. The closing member 7B is formed of a non-deformable material such as resin and metal. The closing member 7B includes a first dividing member 71B, a second dividing member 72B, a third dividing member 73B, and a fourth dividing member 74B.

Each of the first to fourth dividing members 71B to 74B is formed in a square plate shape. The first dividing member 71B is formed in a size that can close the entirety of the mounting port 221B. The first dividing member 71B is turnably coupled on the lower end side of the tilted surface part 126B. The first dividing member 71B turns around a pair of left and right first rotation axes 711B (FIG. 9 to FIG. 11 illustrate only the left first rotation axis 711B).

As illustrated in FIG. 11, the second dividing member 72B is formed in a size smaller than the first dividing member 71B. The second dividing member 72B is configured such that it can slide from one surface side (in FIG. 11, the bottom surface side) of the first dividing member 71B in one direction (in FIG. 11, the forward direction).

The third dividing member 73B is formed in a size smaller than the second dividing member 72B. The third dividing member 73B is configured such that it can slide from one surface side (in FIG. 11, the bottom surface side) of the second dividing member 72B in one direction (in FIG. 11, the forward direction).

The fourth dividing member 74B is formed in a size smaller than the third dividing member 73B. The fourth dividing member 74B is configured such that it can slide from one surface side (in FIG. 11, the bottom surface side) of the third dividing member 73B in one direction (in FIG. 11, the forward direction). The fourth dividing member 74B is turnably coupled on one end side (in FIG. 11, the front end side) of the third dividing member 73B.

As illustrated in FIG. 11, the first to fourth dividing members 71B to 74B close the transaction port 201 in such a manner that the second to fourth dividing members 72B to 74B slide forward with respect to the first dividing member 71B and that the fourth dividing member 74B turns to tilt with respect to the third dividing member 73B. In the state where the transaction port 201 is closed by the closing member 7B, the top surface of the first to third dividing members 71B to 73B is horizontal. This horizontal top surface of the first to third dividing members 71B to 73B makes up a placing surface 712B on which to place where the banknote transport cassette 15. The rear end of the placing surface 712B that makes up the first dividing member 71B is at the same height as a bottom portion 222B of the mounting port 221B.

When closing the mounting port 221B, the operator slides the second to fourth dividing members 72B to 74B to overlap the first dividing member 71B, and turns the entirety of the closing member 7B rearward as illustrated in FIG. 9. That is, the operator turns the closing member 7B after contracting it. When closing the transaction port 201, the operator turns the entirety of the closing member 7B forward as illustrated in FIG. 10, and then turns the fourth dividing member 74B downward by sliding forward the second to fourth dividing members 72B to 74B as illustrated in FIG. 11. That is, the operator extends the closing member 7B after turning it. The operator places the banknote transport cassette 15 on the placing surface 712B, and pushes it rearward to slide it on the placing surface 712B and mount it to the cassette mounting unit 22.

Operation and Effect of Embodiment 3

The sheet processing device 1B provides the following effects in addition to the same effects as those of the sheet processing device 1 of Embodiment 1. The closing member 7B closes the transaction port 201 when it is extended, and closes the mounting port 221B when it is contracted. Thus, the operator can selectively close one of the transaction port 201 and the mounting port 221B through an easier operation of extending, contracting, and turning the closing member 7A.

Embodiment 4

Configuration of Sheet Processing Device

Figure 12:
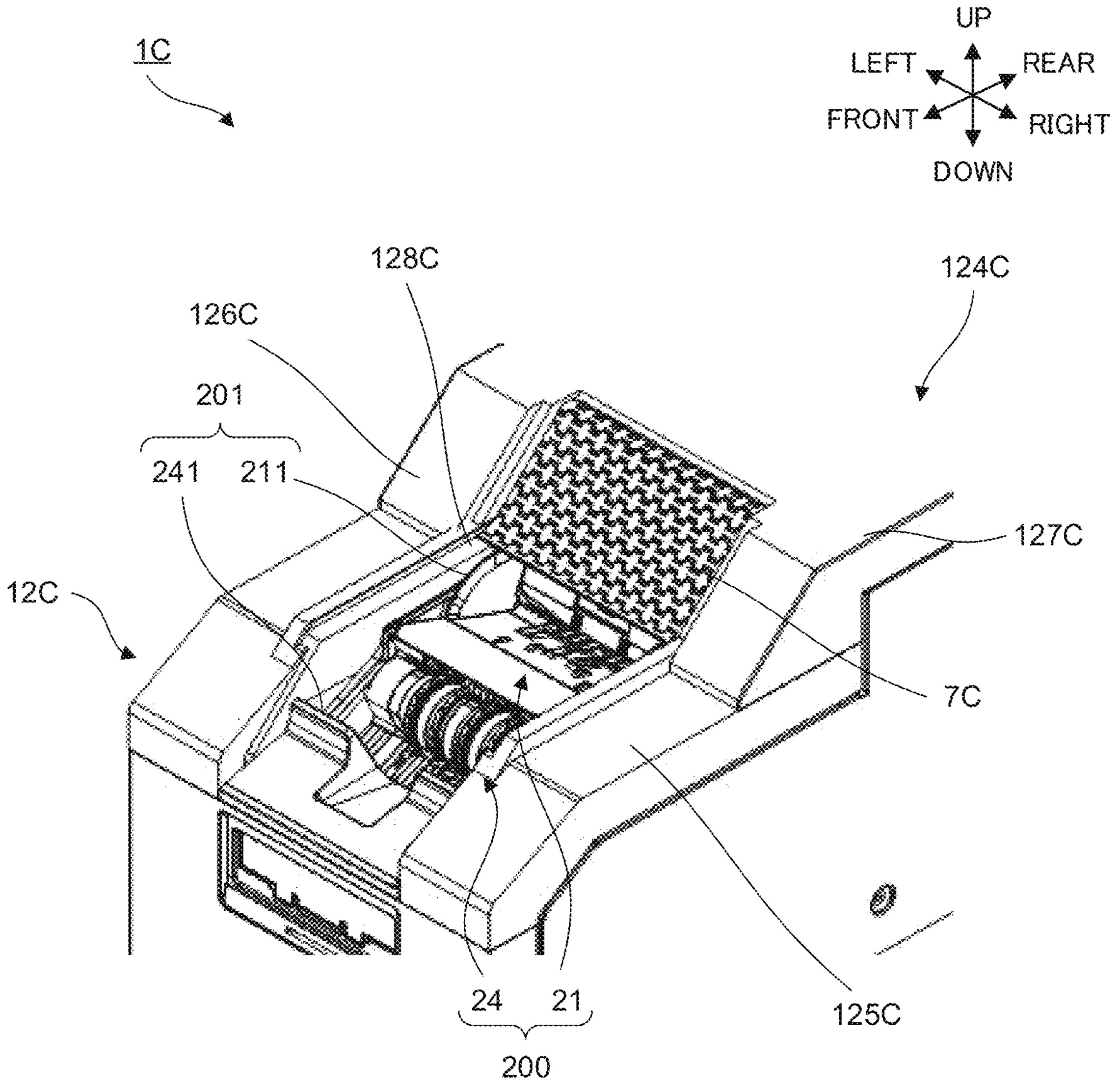
FIG. 12 is a perspective view of an upper housing according to Embodiment 4 of the present disclosure, and illustrates a state where a closing member closes a mounting port.
Figure 13:
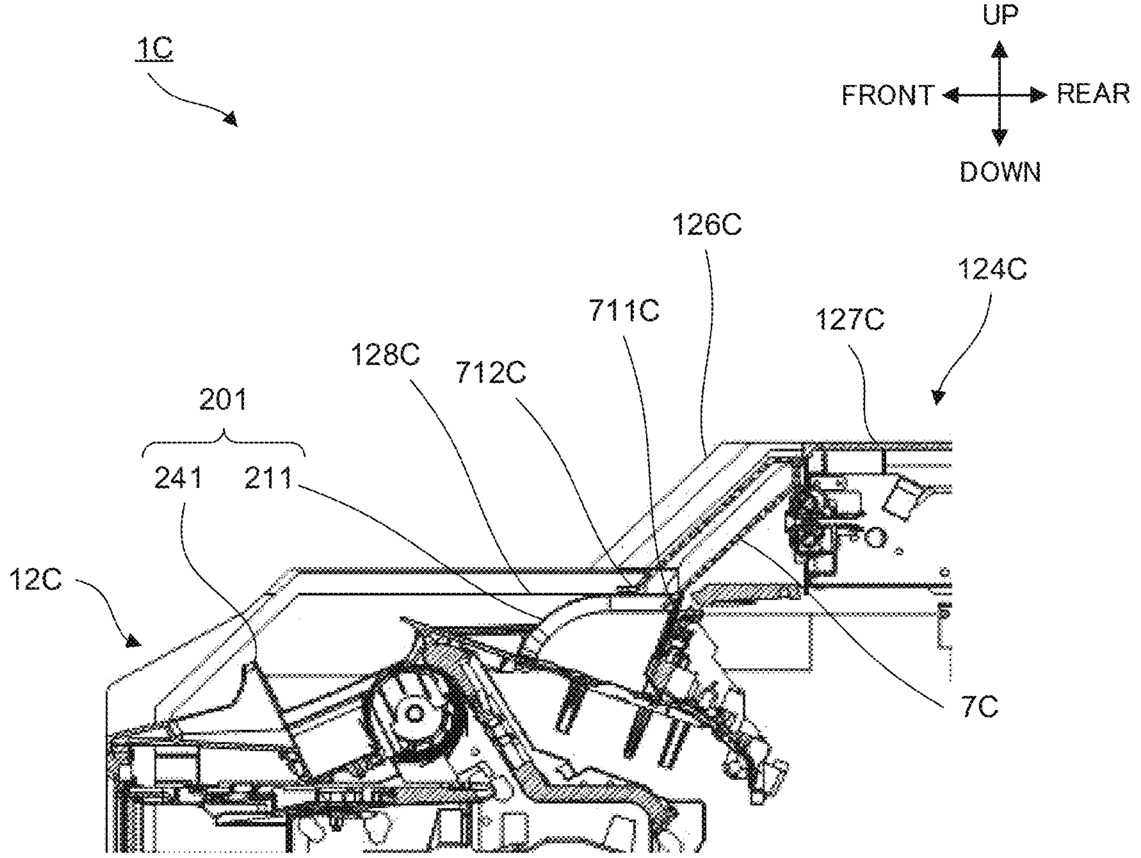
FIG. 13 is a diagram illustrating the inside of the upper housing according to Embodiment 4 of the present disclosure, and illustrates a state where the closing member closes the mounting port.
Figure 14:
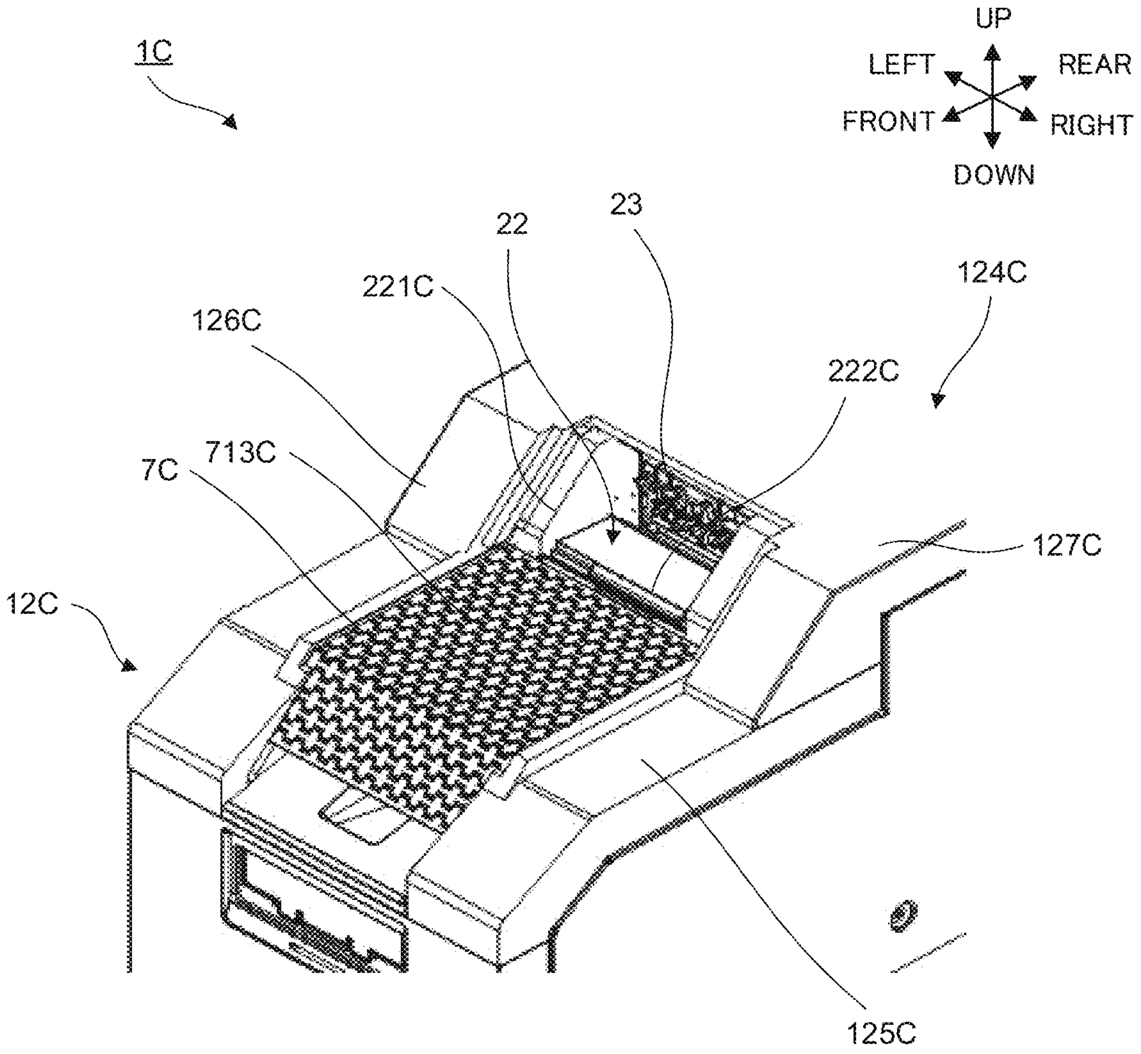
FIG. 14 is a perspective view of the upper housing according to Embodiment 4 of the present disclosure, and illustrates a state where the closing member closes the transaction port.
Figure 15:
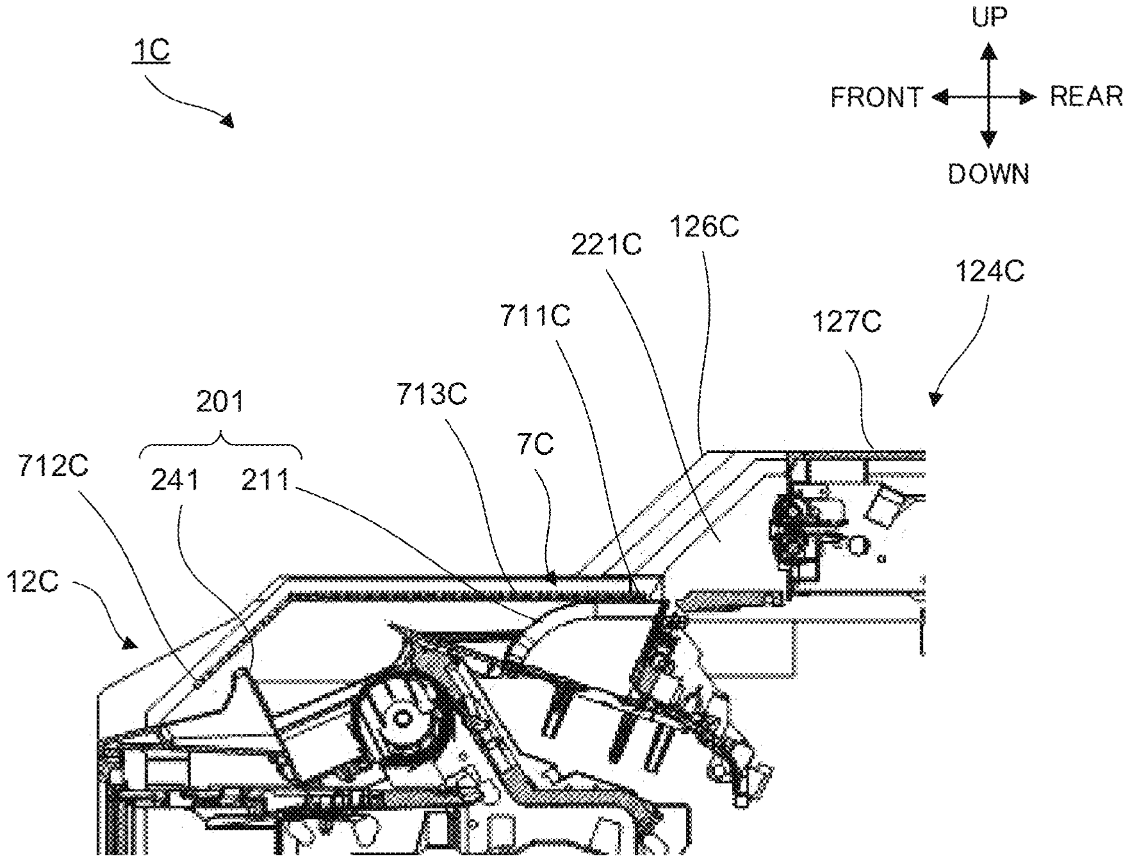
FIG. 15 is a diagram illustrating the inside of the upper housing according to Embodiment 4 of the present disclosure, and illustrates a state where the closing member closes the transaction port.

Next, a configuration of a sheet processing device according to Embodiment 4 of the present disclosure is described. Note that the sheet processing device of Embodiment 1 and the sheet processing device of Embodiment 4 are different from each other in the configurations of the upper housing and the closing member, and therefore the difference is described. FIG. 12 is a perspective view of the upper housing, and illustrates a state where a closing member closes a mounting port. FIG. 13 is a diagram illustrating the inside of the upper housing, and illustrates a state where a closing member closes a mounting port. FIG. 14 is a perspective view of the upper housing, and illustrates a state where the closing member closes the transaction port. FIG. 15 is a diagram illustrating the inside of the upper housing, and illustrates a state where the closing member closes the transaction port.

As illustrated in FIG. 12, an upper housing 12C of a sheet processing device 1C is different from the upper housing 12 of Embodiment 1 in the shape of a top surface part 124C. A front top surface part 125C of the top surface part 124C is provided with the inlet 211 and the outlet 241. A tilted surface part 126C and a rear top surface part 127C of the top surface part 124C are provided with a mounting port 221C that makes up the cassette mounting unit 22 as illustrated in FIG. 14. The mounting port 221C is adjacently provided on the upper side of the transaction port 201.

As illustrated in FIG. 12 to FIG. 15, the top surface part 124C is provided with the closing member 7C. The closing member 7C is configured to selectively close one of the transaction port 201 and the mounting port 221C, and to not close the other of the transaction port 201 and the mounting port 221C. The closing member 7C is configured to be foldable using a non-deformable material such as resin and metal. The closing member 7C is composed of a shutter, for example. The closing member 7C is configured to be foldable using a non-deformable material such as resin and metal.

The closing member 7C is turnably coupled in the vicinity of the boundary between the front top surface part 125C and the tilted surface part 126C. The closing member 7C turns around a pair of left and right rotation axes 711C (FIG. 13 and FIG. 15 illustrate only the right rotation axis 711C). A pair of supported parts 712C protruding to the left and right sides (FIG. 13 and FIG. 15 illustrate only the right supported part 712C) is provided on the turning end side in the closing member 7C. The supported part 712C is supported from below by a pair of rails 128C (FIGS. 12, 13, and 15 illustrate only the left rail 128C) continuously provided from the rear end to the vicinity of the front end of the front top surface part 125C. The closing member 7C selectively closes one of the transaction port 201 and the mounting port 221C by sliding in the front-rear direction while keeping the state where the supported part 712C is supported by the pair of rails 128C.

As illustrated in FIG. 14 and FIG. 15, in the state where the transaction port 201 is closed by the closing member 7C, the top surface of the closing member 7C is horizontal. This horizontal top surface makes up a placing surface 713C on which to place the banknote transport cassette 15. The rear end of the closing member 7C that makes up the placing surface 713C is at the same height as a bottom portion 222C of the mounting port 221C.

When closing the mounting port 221C, the operator pushes rearward the front end portion (turning end portion) of the closing member 7C. Through this operation, the supported part 712C slides rearward while keeping the state where it is supported by the pair of rails 128C, and the closing member 7C is folded such that the folded portion turns rearward, and thus, it closes the mounting port 221C as illustrated in FIG. 12 and FIG. 13. When closing the transaction port 201, the operator pulls the front end portion of the closing member 7C forward. Through this operation, the supported part 712C slides forward while keeping the state where it is supported by the pair of rails 128C, and the turning base end side turns forward while the folded portion of the closing member 7C is reduced, and thus, it closes the transaction port 201 as illustrated in FIG. 14 and FIG. 15. The operator places the banknote transport cassette 15 on the placing surface 713C and slides it on the placing surface 713C by pushing it rearward so as to mount the cassette mounting unit 22.

Operation and Effect of Embodiment 4

The sheet processing device 1C provides the following effects in addition to the same effects as those of the sheet processing device 1 of Embodiment 1. The closing member 7C closes the transaction port 201 when it is not folded, and closes the mounting port 221B when it is folded. Thus, the operator can selectively close one of the transaction port 201 and the mounting port 221C through an easier operation of turning the closing member 7C and adjusting the folding state.

Modifications of Embodiments

It goes without saying that the present disclosure is not limited to the above-described embodiments, and various variations may be added to the extent that the purpose of the disclosure is not deviated from. The above embodiments and the following variations may be combined in any way to the extent applicable.

The Embodiments 1 to 4 may have the following configurations. The depositing unit 21 or the dispensing unit 24 need not be provided. The mounting ports 221 and 221A to 221C may be adjacently provided on the lower side of the transaction port 201, or may be adjacently provided on the left or right side of the transaction port 201. The closing members 7 and 7A to 7C need not be provided with the placing surfaces 712, 712A, 712B and 713C on which to place the banknote transport cassette 15. The placing surfaces 712 and 712A need not be provided with the guides 713 and 713A, and the placing surfaces 712B and 713C may be provided with a guide with the same function as the guides 713 and 713A. The placing surfaces 712, 712A, 712B and 713C may be higher or lower than the bottom portions 222, 222A to 222C of the mounting ports 221 and 221A to 221C. The closing members 7 and 7A to 7C may be formed of deformable material such as sheet-like resins, fibers and the like. A driving mechanism that automatically moves the closing members 7 and 7A to 7C may be provided so as to selectively close one of the transaction port 201 and the mounting port 221C.

The Embodiments 1 to 4 may have a configuration in which the transaction port 201 is closed when the closing members 7 and 7C are folded, and the mounting ports 221 and 221C are closed when the closing members 7 and 7C are not folded. The Embodiment 2 may have a configuration in which the mounting port 221A is closed when the closing member 7A slides forward, and the transaction port 201 is closed when it slides rearward. The Embodiment 3 may have a configuration in which the mounting port 221B is closed when the closing member 7B is extended, and the transaction port 201 is closed when it is contracted.

The media to be processed by the medium processing device may be gift certificates, checks, securities, card-like media, coins, and the like.

This application is entitled to and claims the benefit of Japanese Patent Application No. 2020-182561 filed on Oct. 30, 2020, the disclosure each of which including the specification, drawings and abstract is incorporated herein by reference in its entirety.

The present disclosure is applicable to medium processing devices.

The invention claimed is:

1. A medium processing device, comprising:

a housing;

a transaction port with which a part of the housing is provided, the transaction port through which a medium is taken in;

a cassette mount with which a part of the housing is provided, the cassette mount to which a medium cassette is capable of being mounted, the medium cassette for transferring a medium to and from the medium processing device; and a closing member with which the part of the housing is provided, the closing member to selectively close one of the transaction port and the cassette mount, wherein the closing member is provided with a placing surface where the medium cassette is placed when the closing member closes the transaction port.

2. The medium processing device according to claim 1, wherein the cassette mount is disposed on an upper side of the transaction port.

3. The medium processing device according to claim 1, wherein the placing surface is at a same height as a bottom portion of the cassette mount when the closing member closes the transaction port.

4. The medium processing device according to claim 1, wherein the placing surface is provided with a guide to guide the medium cassette placed on the placing surface to the cassette mount.

5. The medium processing device according to claim 1, wherein the closing member selectively closes one of the transaction port and the mounting port cassette mount by turning around a turning axis.

6. The medium processing device according to claim 5, wherein the closing member selectively closes one of the transaction port and the cassette mount by extending or contracting.

7. The medium processing device according to claim 5, wherein the closing member selectively closes one of the transaction port and the cassette mount when the closing member is folded.

8. The medium processing device according to claim 1, wherein the closing member selectively closes one of the transaction port and the cassette mount by sliding along rail.

9. The medium processing device according to claim 1, wherein the transaction port includes an inlet through which the medium is taken in and an outlet through which the medium is taken out.

10. The medium processing device according to claim 1, wherein the closing member does not close an other of the transaction port and the cassette mount when the closing member closes the one of the transaction port and the cassette mount.

11. The medium processing device according to claim 1, wherein the medium cassette is capable of being placed on the placing surface and mounted to the cassette mount when the closing member closes the transaction port.

12. The medium processing device according to claim 1, wherein the closing member is capable of being folded, and the closing member closes the cassette mount when the closing member is folded, and the closing member closes the transaction port when the closing member is not folded.

13. The medium processing device according to claim 12, wherein the closing member includes a first member provided with the placing surface and a second member, and the closing member is folded by the second member making contact with a surface on a side opposite to the placing surface of the first member.

14. The medium processing device according to claim 13, wherein the first member is turnably coupled to a part of the housing and turnable around a first axis, and the second member is turnably coupled to the first member and turnable around a second axis.

* * * * *